(12) United States Patent
Cavote et al.

(10) Patent No.: US 11,298,655 B2
(45) Date of Patent: Apr. 12, 2022

(54) WALL-MOUNTED PLANT-BASED AIR PURIFICATION SYSTEM

(71) Applicant: Biome, Inc., Oakland, CA (US)

(72) Inventors: Collin Cavote, Oakland, CA (US); Collin Stoner, Oakland, CA (US)

(73) Assignee: Biome, Inc., Oakland, CA (US)

( * ) Notice: Subject to any disclaimer, the term of this patent is extended or adjusted under 35 U.S.C. 154(b) by 0 days.

(21) Appl. No.: 16/184,897

(22) Filed: Nov. 8, 2018

(65) Prior Publication Data

US 2019/0134561 A1    May 9, 2019

Related U.S. Application Data

(60) Provisional application No. 62/583,434, filed on Nov. 8, 2017.

(51) Int. Cl.
| | | |
|---|---|---|
| *B01D 53/00* | (2006.01) | |
| *B01D 53/30* | (2006.01) | |
| *B01D 53/34* | (2006.01) | |
| *B01D 53/74* | (2006.01) | |
| *B01D 53/84* | (2006.01) | |
| *F24F 3/16* | (2021.01) | |
| *F24F 8/175* | (2021.01) | |

(52) U.S. Cl.
CPC ............ *B01D 53/84* (2013.01); *B01D 53/30* (2013.01); *F24F 3/16* (2013.01); *B01D 2253/102* (2013.01); *B01D 2257/708* (2013.01); *B01D 2259/4508* (2013.01); *F24F 8/175* (2021.01)

(58) Field of Classification Search
CPC ........ B01D 53/00; B01D 53/30; B01D 53/34; B01D 53/74; B01D 53/84; B01D 2253/00; B01D 2253/10; B01D 2253/102; B01D 2257/00; B01D 2257/70; B01D 2257/708; B01D 2259/00; B01D 2259/45; B01D 2259/4508; F24F 3/00; F24F 3/12; F24F 3/16; F24F 3/1603; F24F 2003/1653
See application file for complete search history.

(56) References Cited

U.S. PATENT DOCUMENTS

| | | | | |
|---|---|---|---|---|
| 6,230,437 B1 * | 5/2001 | Wolverton | ............. | A47G 7/041 47/39 |
| 2014/0318011 A1 * | 10/2014 | Jarvinen | ................ | A01G 9/025 47/79 |

FOREIGN PATENT DOCUMENTS

WO    WO-2016147195 A1 *    9/2016    ........... A01G 31/047

* cited by examiner

*Primary Examiner* — Natasha E Young
(74) *Attorney, Agent, or Firm* — Buchalter; Jason W. Croft

(57) ABSTRACT

The present disclosure generally relates to plant-based air purification systems and more particularly to wall mounted systems for removing impurities from indoor air using plants.

19 Claims, 26 Drawing Sheets

Inserted Module

WALL-MOUNTED PLANT-BASED AIR PURIFICATION SYSTEM

CROSS-REFERENCES TO RELATED APPLICATIONS

This application claims benefit from and is a non-provisional of U.S. Provisional Patent Application No. 62/583,434, filed Nov. 8, 2017 entitled "WALL-MOUNTED PLANT-BASED AIR PURIFICATION SYSTEM".

FIELD OF THE INVENTION

The present disclosure generally relates to plant-based air purification systems and more particularly to wall mounted systems for removing impurities from indoor air using plants.

BACKGROUND

Indoor air quality in office buildings is becoming more of a concern. Office buildings are often constructed with venting systems that move air around and, unlike structures where many windows can be opened to replace indoor air with outdoor air, the indoor air in many modern buildings is the air that the venting system, such as a heating-venting-air-conditioning (HVAC) system provides. Mixed in with that air are volatile compounds and other airborne gasses and molecules that the venting system cannot, or has not yet, removed. In light of these concerns, organizations have promoted various programs to improve indoor air quality, whether by improving the air that is supplied, clearing the air that is present, and/or taking steps to ensure that objects in the interior spaces do not contribute to poor indoor air quality in the first place.

Certification programs, such as those of the Living Building Challenge (LBC) organization and the Declare™ program promoted by the International Living Future Institute, relate to air quality and material safety standards. These might be similar to, but in some ways more rigorous than, energy efficiency standards such as the LEED (Leadership in Energy and Environmental Design) standards. In addition to outside pollutants entering a building, building components themselves and furniture can release chemicals, such as formaldehyde and other volatile organic compounds. The LBC organization has promulgated a "red list" of materials that should be avoided in building components to comply with the LBC standards, and the Declare label provides a way to certify materials as being free from these materials. Chemicals on the red list include asbestos, bisphenol A, cadmium, chlorinated polyvinyl chloride, lead, mercury, polychlorinated biphenyls, phthalates, and polyvinyl chloride. Traditional filters and HVAC systems may not adequately remove these chemicals and interior mechanisms for removing these chemicals might be needed. As concern for indoor air quality grows, there is a need for improved air purification systems that are economical to install and maintain, while not themselves introducing volatile compounds yet being reliable to use.

SUMMARY

In specific embodiments of an indoor air purification system described herein, indoor air is filtered over root systems of specific plants and an array of sensors provides inputs to a computer controller that controls various parameters of how the air is filtered and how the plants of the indoor air purification system are managed. One goal might be to optimize the filtering of indoor air while maintaining the plant health so that their root systems can continue to perform filtering, while adjusting for changing conditions and also minimizing the user maintenance needed to maintain the plant-based indoor air purification system.

In various aspects, the plant-based air purification system monitors an indoor air environment, detects specific undesirable compounds, and monitors conditions. Based on those inputs, particular modular plant units can be selected. Those modular plant units can be inserted into an air purification system housing that uses the root systems of those plants to filter out those undesirable compounds, while itself not adding to the compound load (the sum of the concentrations of all undesirable compounds in the air) of the indoor air. The plant-based air purification system is preferably designed for simplified airflow, replaceability of plant modules, water distribution, and the like, mindful of the typical indoor environment wherein loose water is undesirable and the need to constant monitoring is undesirable.

The plant-based air purification system uses the selected modular plant units, and typically, the root systems of those plants, to filter out undesirable compounds. In some variations, the specifics of a particular mounting location are taken into account in the plant selection, while in others they are not. The modular plant units might be designed for ease of shipping live plants to reduce possible shipping damage and for ease of installation and replacement by end users, while still maintaining adequate control over plant growth, water movement and air movement.

In some variations, there might be a feedback loop, such as where air quality is detected using an array of sensors to detect certain compounds, components, and/or characteristics of the indoor air, computation is done to determine which plant modules to select, the selected plant modules are inserted into the plant-based air purification system, which handles air flow and water management, the indoor air is again passed over an array of sensors to derive changes possibly due to the plant modules. In some variations, there is also a real-time feedback loop that takes actions based on current conditions, such as moving water or air in response to inputs.

In each of the plant modules (or plant pods), the module can adapt to the plant-based air purification system so that air flows as desired, such as being urged or forced over the root systems of the plants in the plant modules. The selected plant modules might be selected based on a computation of the compounds to remove and which plant species have a significant effect on which compounds. A plant's root system might fix a compound, thus removing it from the circulating indoor air or the plant's root system might molecularly modify the compound into another compound that is less undesirable. In this manner, it is efficient, economical and maintainable to have plant root systems clean indoor air by absorbing gases and volatile organic compounds, possibly supplementing what air filter building systems can do.

In a specific embodiment, a plant module is adapted to hold a root ball of a live plant and comprises two shell portions and a hinge flexibly connecting the shell portions such that they are movable between an open position and a closed position, wherein the root ball is insertable into the plant module in the open position. The plant module might also have a sealing rim configured to support the plant module in a vertical plant holder while also forming a seal allowing for differences in air pressure between a first side of the sealing rim and an opposite side of the sealing rim. The plant module might also have a first pliant covering, attached to the first shell portion, configured to support the plant module in a vertical plant holder while also forming a seal allowing for differences in air pressure between a first side of the sealing rim and an opposite side of the sealing rim. Additional pliant coverings, such as a second pliant covering attached to the second shell portion and overlapping the first pliant covering, might be used.

In some embodiments, the plant module has one or more interior baffles formed as part of the first shell portion and/or the second shell portion for constraining movement of the root ball when inserted into the plant module, such as during shipping, and one or more exterior features formed as part of the first shell portion and/or the second shell portion for constraining movement of the plant module relative to a shipping container when the one or more exterior features are in contact with the shipping container and/or packing materials inside the shipping container.

In some embodiments, the plant module has a front face, having thereon an array of openings for receiving plant modules, a plurality of watertight lips, wherein a watertight lip is provided for each opening of the array of openings, positioned to direct falling liquids from an exterior of the vertical plant module holder to an interior region of the vertical plant module holder, a rear face, configured in a clamshell arrangement wherein the front face and the rear face at least partially enclose the interior region, and a mechanism for collecting and distributing water from within the interior region, wherein the rear face and the front face are attached and form an airtight seal and a watertight seal without requiring use of epoxy.

A system for indoor air purification might comprise a housing comprising a plastic body formed of multipart HDPE or Red List compatible materials, a sensor board comprising a circuit board that is removable from the housing, a plurality of receptacles, each of which receives a respective plant module, at least one fan connected to and controlled by the sensor board, and at least one pump that pumps water to the receptacles. A unibody for the system might comprise a multipart HDPE or Red List compatible plastic in a formed and bonded state formed such that plastic components of the unibody are sealed and use no epoxy or adhesives to create a waterproof enclosure for growing plants and is thereby "Red List Free", easily recyclable, and leak-proof, with the body capable of holding plants and comprising externally mounted pumps, fans, and other electronics for easy replacement of those components without needing to open the unibody, and openings with gaskets that create an air-tight and water-tight seal when fixtures are inserted.

The body might comprise a faceplate/facade that protects the unibody, and might comprise mounts on the body that creates air pockets that insulate the unibody from temperature swings thereby protecting the plants.

A plant module might comprise a soft overmold forming a plant module that is Red List free and provides an active seal while also providing a soft material for at least one plant to grow and expand into, and internal baffling of the soft overmold that stabilizes roots of the at least one plant contained within the plant module and holds growth media, thereby reducing plant injury during shipping, handling, and maintenance. A chemical or physical pest management tool to that repel insects, fungi, or other plant pest, can be impregnated in the materials of the plant module or applied as a film to the plant module. A securing feature might be used that allows the plant(s) to be secured or locked into the plant module. Baffling features might separate plant stalks thereby preventing rot, pests, and overcrowding of individual plants in the plant module.

A molded HDPE or Red List compatible plastic shell and backing formed and bonded without epoxy or adhesives into a plant shipping receptacle might be used, wherein the plant shipping receptacle is sealed to create a waterproof enclosure for growing plants. The plant shipping receptacle might comprises features that exist within the plant shipping receptacle for the purpose of accepting a plant module, a molded feature that has a gasket that creates an airtight seal around a plant module, preventing water leakage into a packaging, conserving water for enhanced survivability during multi-day shipping, a clipping mechanism that clips the plant module into the molded feature thus securing a shipped plant, and/or a gasket that creates an airtight seal when the plant module is inserted into the plant shipping receptacle.

The following detailed description together with the accompanying drawings will provide a better understanding of the nature and advantages of the present invention.

FIGURES

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unibody Wall Mounted Purification System

Figure 1:
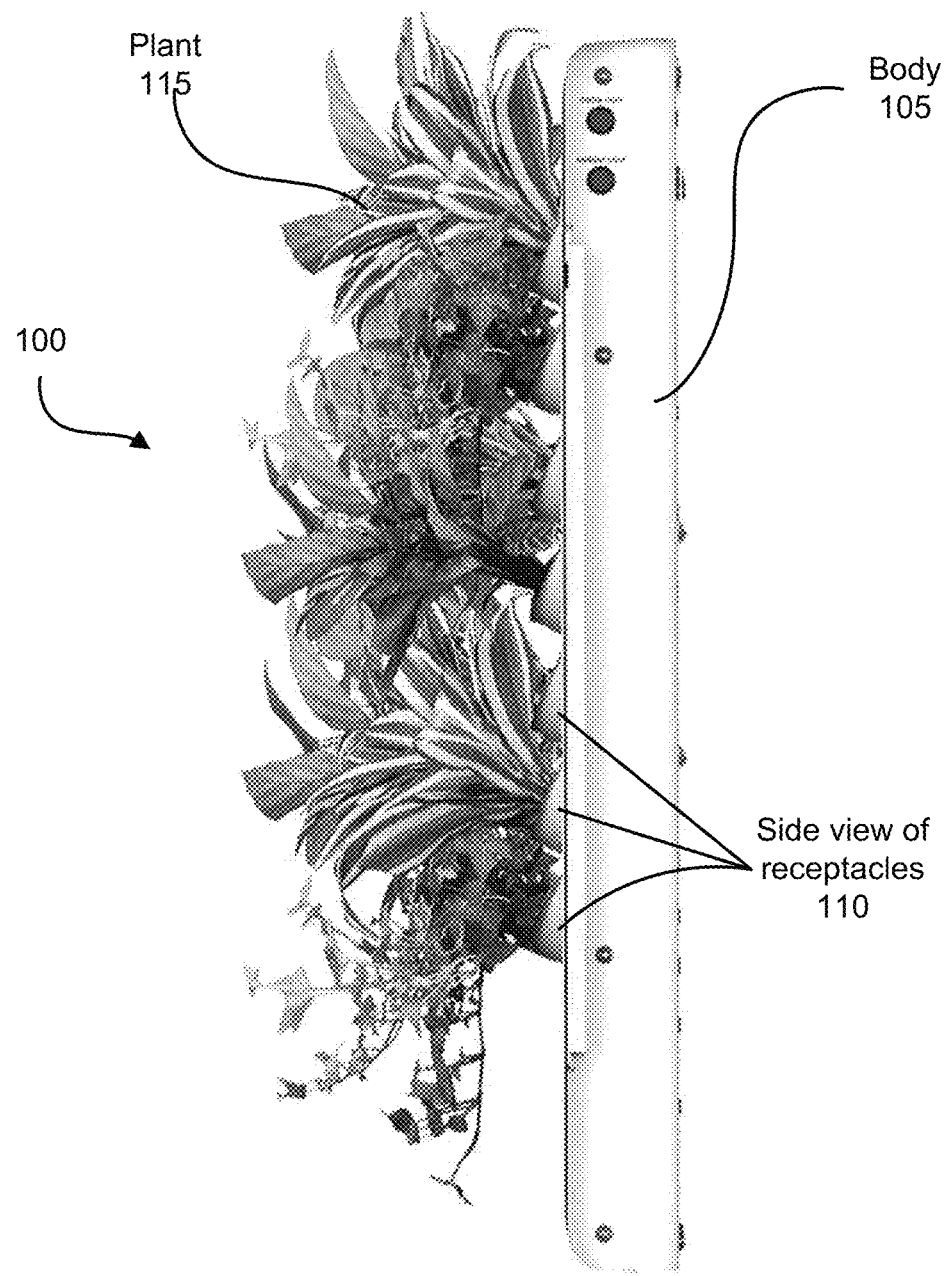
FIG. 1 illustrates a profile view of a plant-based air purification system in accordance with one embodiment.

FIG. 1 illustrates a side view of a plant-based air purification system 100. In one embodiment, the plant-based air purification system comprises a unibody air purification unit 105. The unibody air purification unit has a front face that has therein a plurality of plant receptacles 110, each adapted to receive a plant module 115. In use, a plant module might hold the root ball of a plant and form a seal with its respective plant receptacle so that when an air circulation system of the plant-based air purification system circulates air, the bulk of the airflow is from an indoor space, through the root systems of the plants that are held in their respective plant modules that are mounted in their respective plant receptacles on the front face, through possibly mechanical filters, over an array of sensors and to an air outlet that provides the air back to the indoor space.

The unibody has an outer body that might be formed out of bonded plastic or other material and comprise a rear portion and, together with the front face, are formed to provide a more or less airtight and watertight seal so that the plant-based air purification system can manage airflow over the root systems of the plants that are mounted in the receptacles on the front face and manage water distribution as needed. As a result, the unibody forms an outer shell to hold the plants and channel air to the roots of the plants.

Each plant receptacle is adapted to hold a root ball of a live plant. The body of the plant module holder is advantageously built avoiding problematic materials such as those on the "red list" as promulgated by the LBC. Other problematic materials that are preferably avoided are those listed by government organizations, such as the U.S. Environmental Protection Agency. An example of an acceptable material is HDPE. The plants provide an attractive display that can be attached to a wall or other building structure, thus disguising a functional air purification system. A plant receptacle may receive a plant directly, or may receive a plant module that contains the plant and that supports the plant in some way. For aesthetics, each available plant receptacle might have therein a plant module, but that is not required. In some embodiments, covers might block all or substantially all of the air flow that would otherwise flow through an unoccupied plant receptacle.

Figure 2:
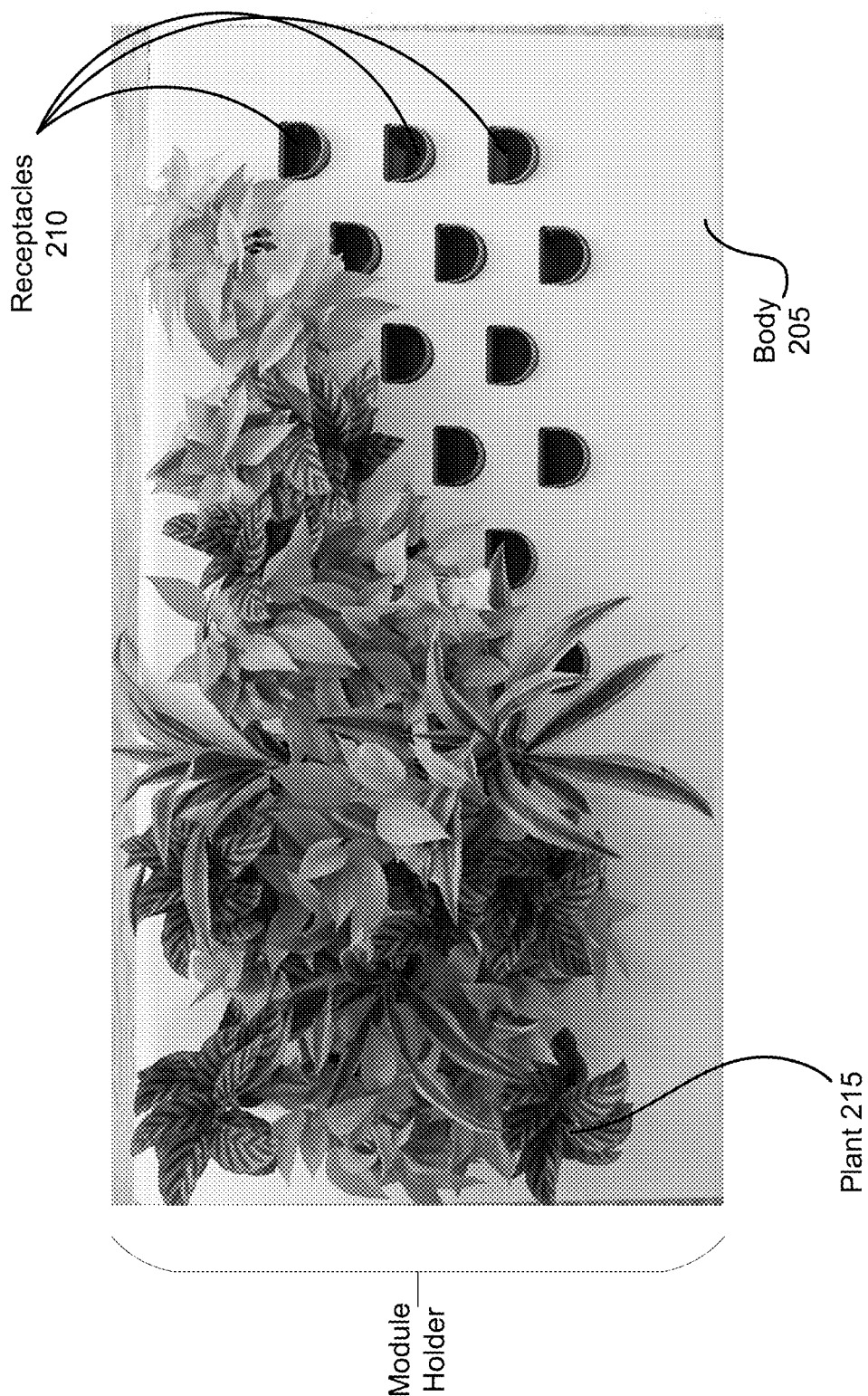
FIG. 2 illustrates a front view of a plant-based air purification system.

FIG. 2 illustrates a front view of the body of the unibody 205 with several of the plant receptacles 210 having plant modules inserted therein. As illustrated, several of the plant receptacles 210 are empty, to illustrate the body 205. When in use, generally, the body 205 would be fully filled with plants 215 or empty receptacles 210 would be covered with blanks to ensure full air flow over the plants in the filled plant receptacles.

Figure 3:
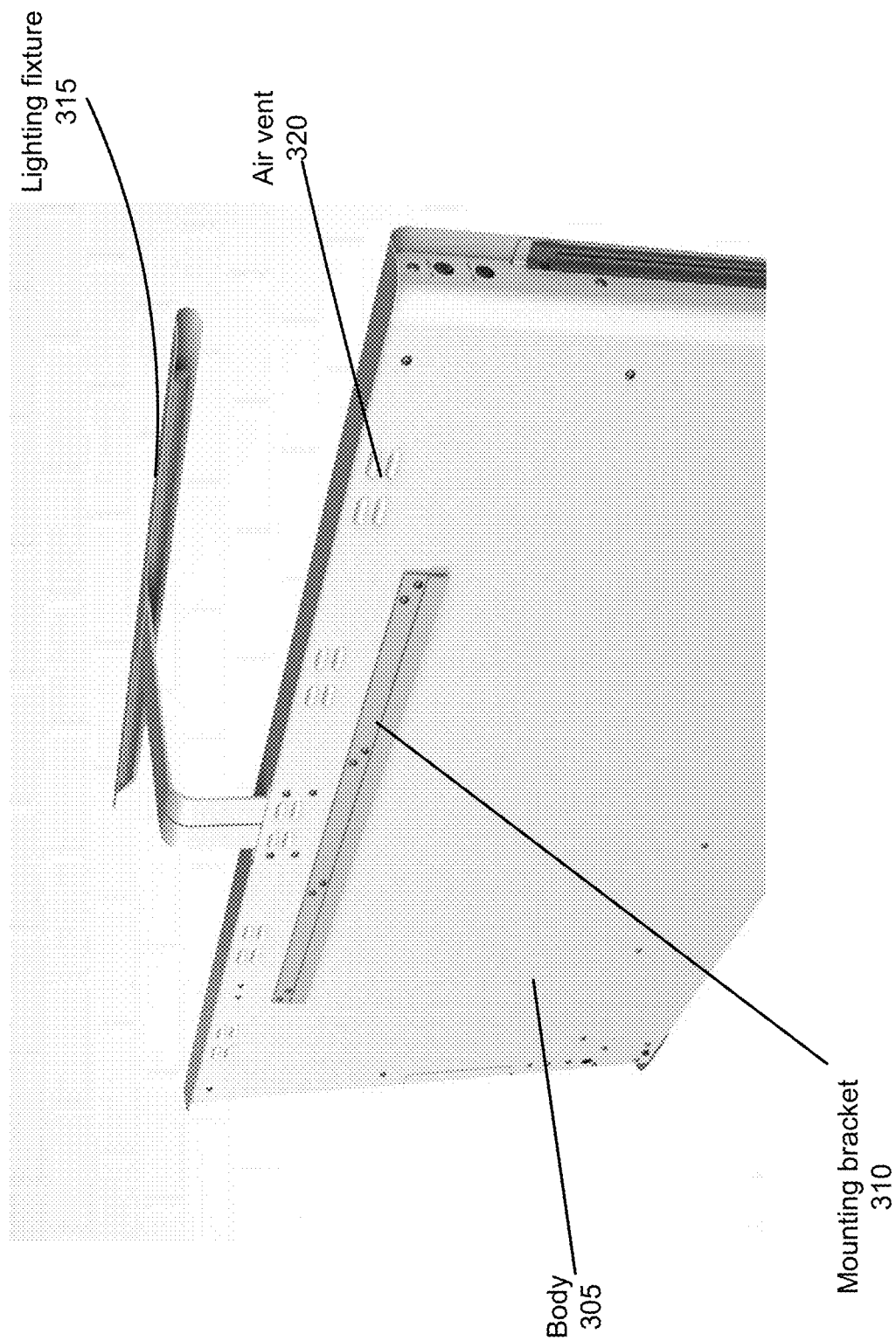
FIG. 3 illustrates the back of a plant-based air purification system with a mounting bracket.

FIG. 3 illustrates the back of the body 305 of the unibody, which has a bracket to mount 310 the unibody on a wall or other building structure. In an embodiment, LED strips may be mounted on the unibody. The unibody may have a lighting fixture 315 to provide light for the plants and for aesthetics. The lighting fixture may use LED or other lighting. An air sensor may be advantageously mounted in the light fixture so as to sample the air some distance from the indoor air purification system to provide a measure of air quality in the room. The LED strips mounted to the light fixture or to the body may change color to indicate different alerts or for aesthetics. In one embodiment, LED strips mounted on the unibody change color in order to communicate an alarm condition such as low water level in the tank or out of specification water conditions. These alarm conditions may also be communicated wirelessly to a network (e.g., by Wi-Fi). The body 305 may have air vents 320 to allow for clean air to be exhausted from the body 305.

The plant receptacles may receive plants directly or, to facilitate replacement of plants, may receive plant modules. In one embodiment, a plant module includes a first shell portion, a second shell portion, and a hinge flexibly connecting the first shell portion and the second shell portion such that they are movable between an open position and a closed position, wherein a root ball of a desired plant is insertable into the plant module in the open position. A plant module preferably includes a sealing rim configured to support the plant module when the front face of the unibody is vertical, while also forming a seal allowing for differences in air pressure between a first side of the sealing rim and an opposite side of the sealing rim.

Figure 4:
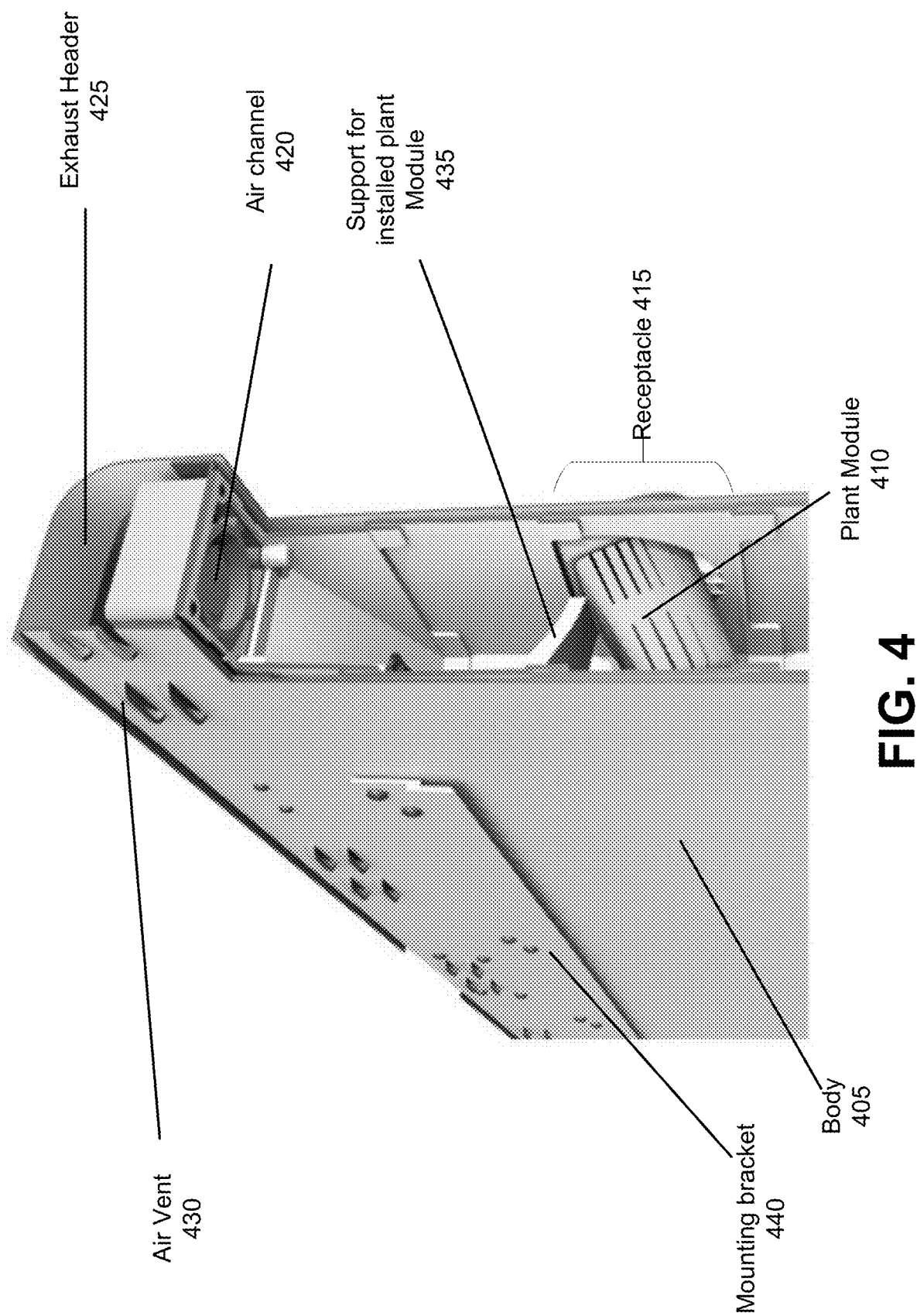
FIG. 4 illustrates a cutaway of the plant-based air purification system to reveal the air flow within the system.

FIG. 4 illustrates a cutaway view of the unibody 405, showing a plant module 410 (without a plant) in a plant receptacle 415. It also shows an air channel 420 which receives air from the portion of the unibody having the receptacles and directs the air to an exhaust header 425, from which air may exit through air vents 430. The unibody 405 also has a support element 435 to hold the plant module in place. The plant module has slits to allow air flow through the root bulb into the portion of the unibody having the receptacles. The unibody also has a mounting bracket to attach the unibody to a wall or other architectural structure.

Figure 5:
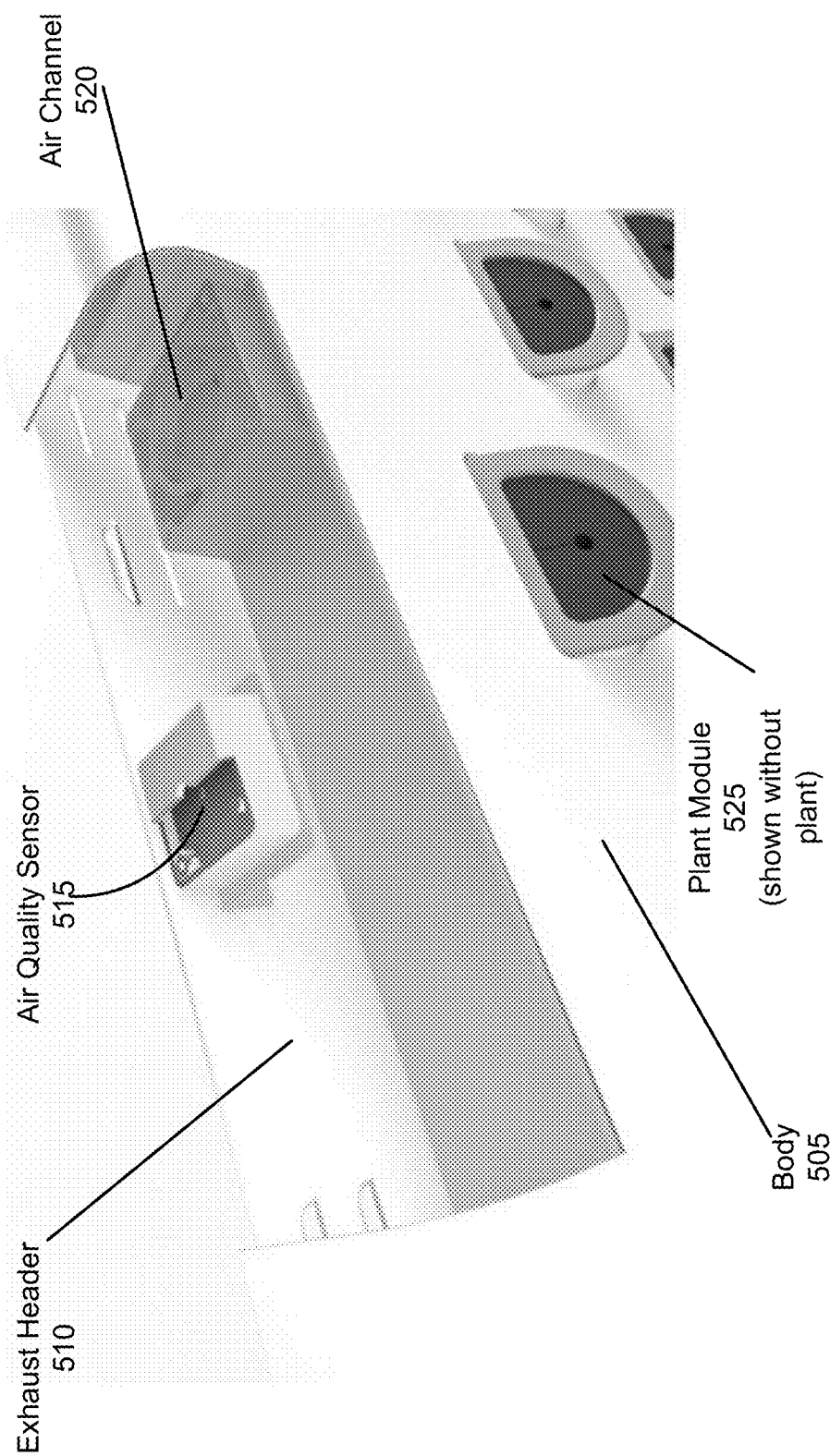
FIG. 5 is a cutaway view of an air exhaust header located within the plant-based air purification system.

FIG. 5 illustrates a second cutaway view of the unibody 505, focusing on the exhaust header 510. There is an air quality sensor 515 in the exhaust header which may, in some embodiments, communicate parameters to a wired or wireless communication module for transmission to a monitoring server. Air enters the exhaust header via the air channel 520. Note that in FIG. 5, the plant modules 525 are shown without plants to better illustrate the plant-based air purification system.

In another embodiment, a plant module adapted to hold a root ball of a live plant comprises a first shell portion, a second shell portion, and a hinge flexibly connecting the first shell portion and the second shell portion such that they are movable between an open position and a closed position. The root ball of the plant is insertable into the plant module in the open position.

In another embodiment, the plant module may further comprise, in addition to the first shell portion and the second shell portion that form a rigid portion, a pliant covering connected to the rigid portion by a fastener or multiple fasteners. In one embodiment, the pliant covering may be made of TPE (ThermoPlastic Elastomer) including TPU (Thermoplastic PolyUrethane) or silicone rubber. The pliant coverings may be formed, for example, in an overmold process. In this embodiment, as the module is placed in an opening of the unibody, the pliant covering is compressed between the rigid portion and the lip of the opening of the unibody, forming an air and watertight seal, directing airflow through the plant module and preventing water and air leaks. In another embodiment, there may be two or more pliant coverings. In one embodiment, there may be a pliant covering that overlaps with a smaller pliant covering. Using a pliant covering that can expand and flex allows for the plant to grow and expand without putting stress on the plant or rigid components.

Figure 6:
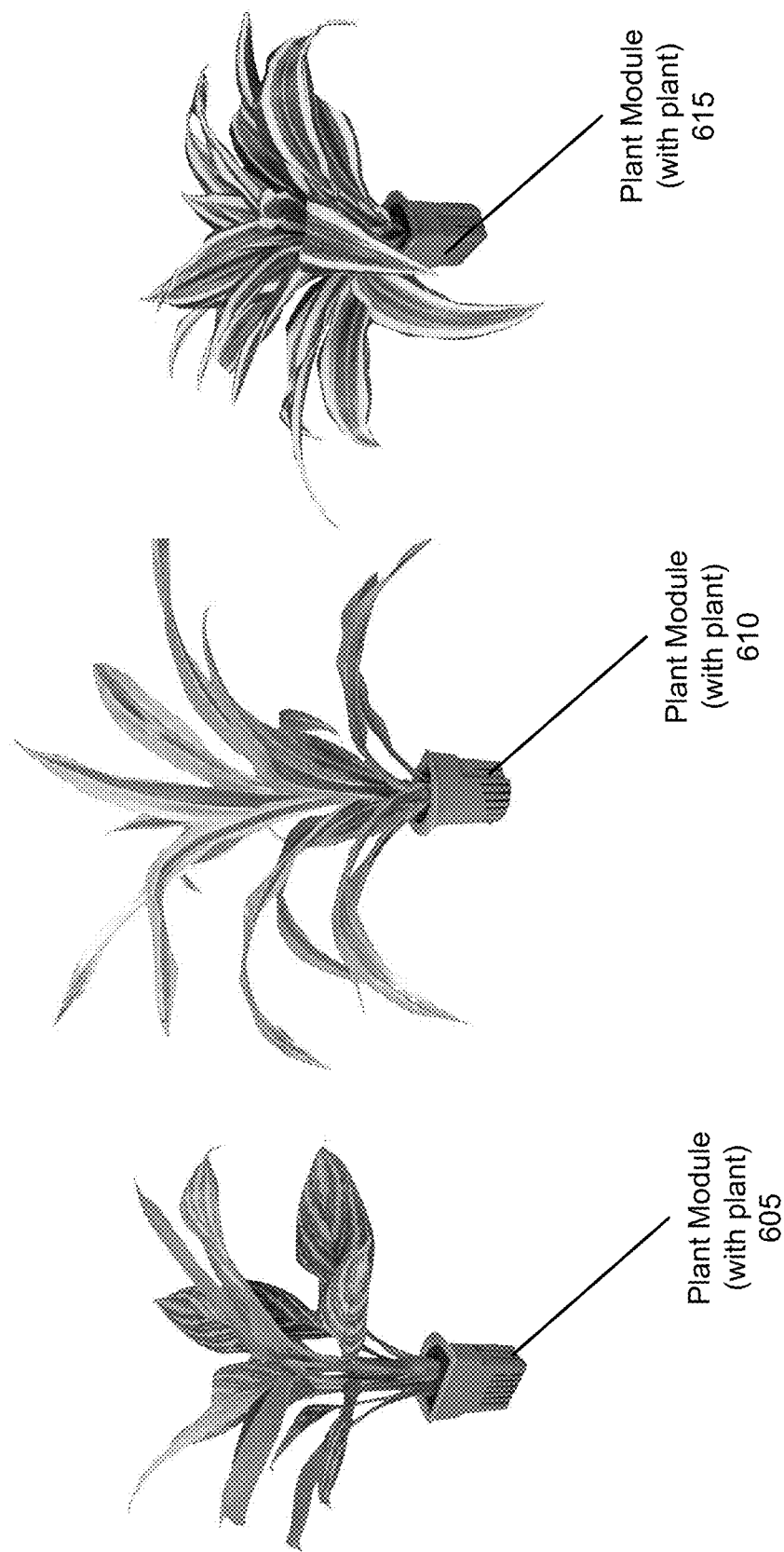
FIG. 6 illustrates three different views of modules that attach in a plant-based air purification system.

FIG. 6 illustrates several different examples of plant modules 605, 610, and 615, from different angles.

Figure 7B:
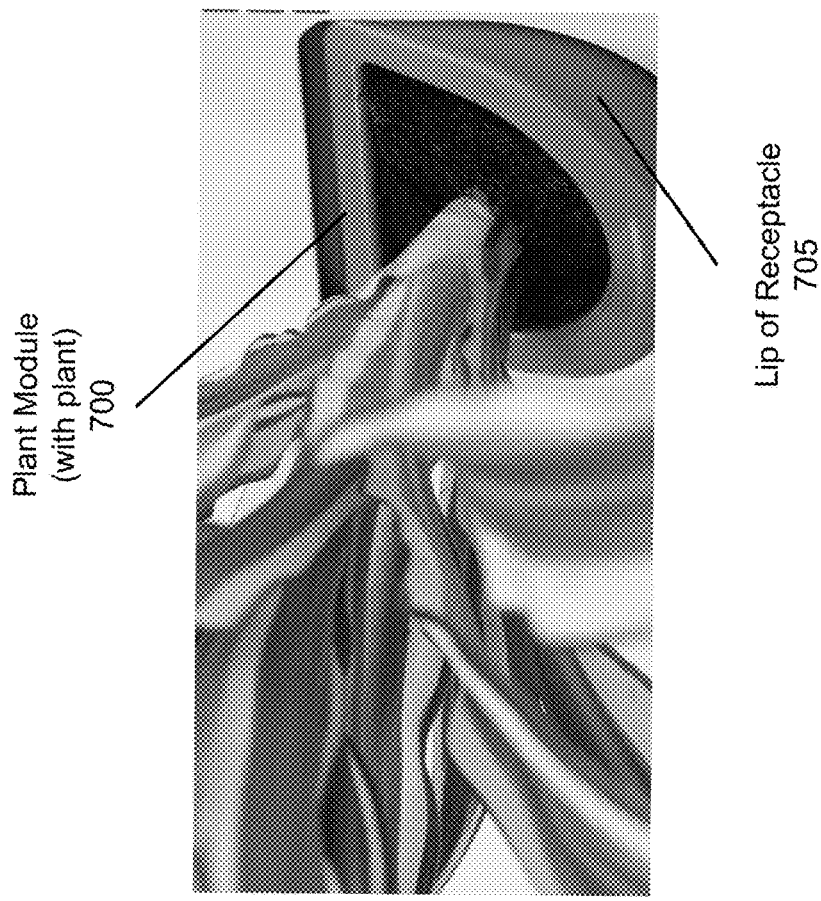
FIG. 7B illustrates a module inserted in a receptacle.
Figure 7A:
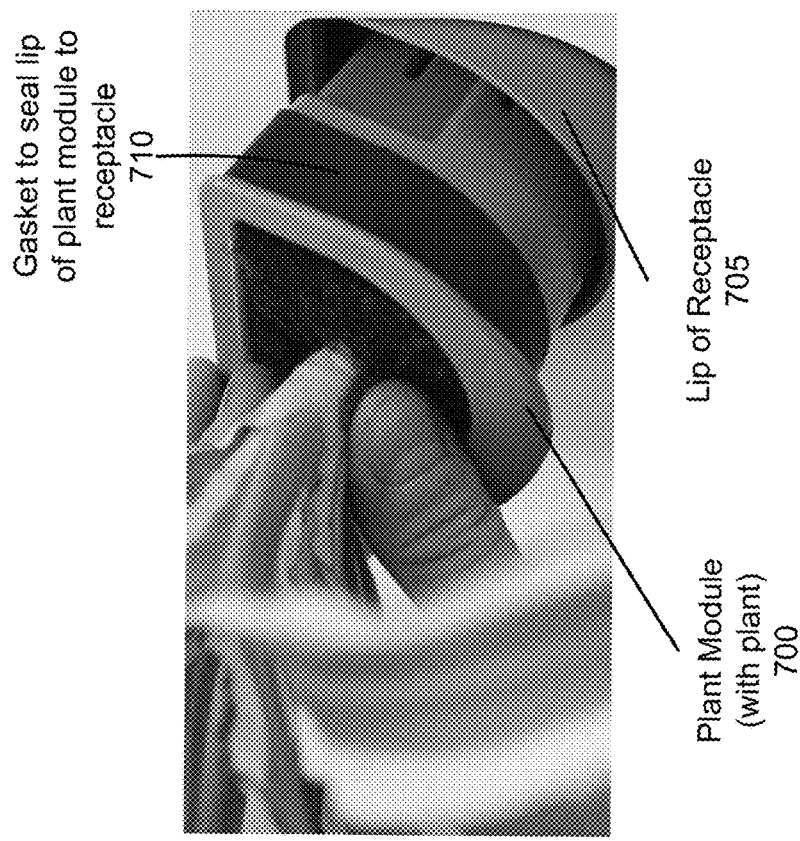
FIG. 7A illustrates a module being inserted into a receptacle in accordance with one embodiment.

FIG. 7A illustrates the plant module 700 being inserted into a plant receptacle having a lip 705. The plant module 700 has a gasket 710 to provide an airtight seal, and FIG. 7B shows the plant module fully inserted in the plant receptacle.

The plant modules may facilitate shipping by supporting and securing the plant. One or more interior baffles can be formed as part of the first shell portion and/or the second shell portion for constraining movement of the root ball when inserted into the plant module, such as during shipping. One or more exterior features formed as part of the first shell portion and/or the second shell portion might constrain movement of the plant module relative to a shipping container when the one or more exterior features are in contact with the shipping container and/or packing materials inside the shipping container. Constraining the plant during shipping prevents jostling of the plant, which could damage the plant and ensures that the plant does not shift during shifting, which could put pressure on the leaves of the plant from either shipping materials or other plants.

In another embodiment, a vertical front face having an array of plant receptacles is adapted to hold a plurality of plant modules. The front face can have thereon an array of openings for receiving plant modules and a plurality of watertight lips, in a regular pattern, such as a hexagonal tiled pattern, a square or rectangular tiled pattern, an irregular pattern, or another pattern. A watertight lip is provided for each opening of the array of openings, positioned to direct falling liquids from an exterior of the vertical front face to an interior region of the unibody. A rear face is configured in a clamshell arrangement. The front face and the rear face at least partially enclose the interior region. The interior region contains a mechanism for collecting and distributing water from within the interior region. The rear face and the front face are attached and form an airtight seal and a watertight seal without requiring the use of epoxy.

Figure 8:
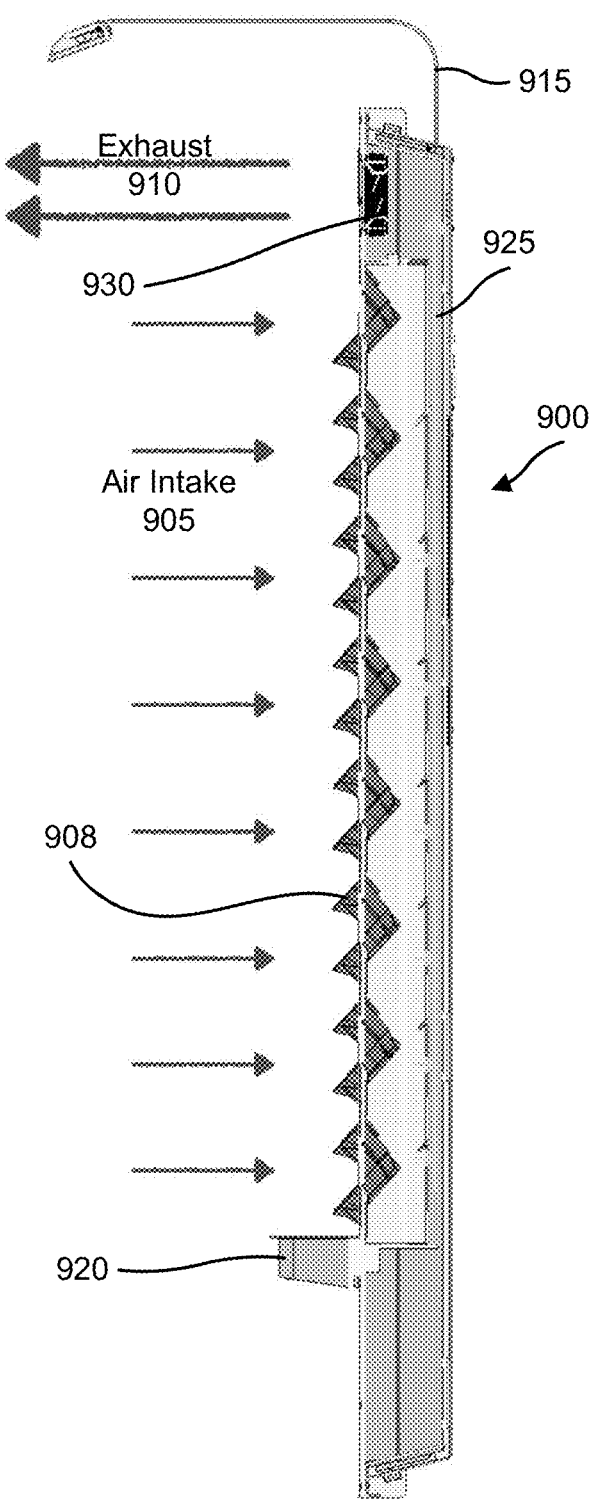
FIG. 8 illustrates a cutaway side view of a second embodiment of the plant-based air purification system.
Figure 9:
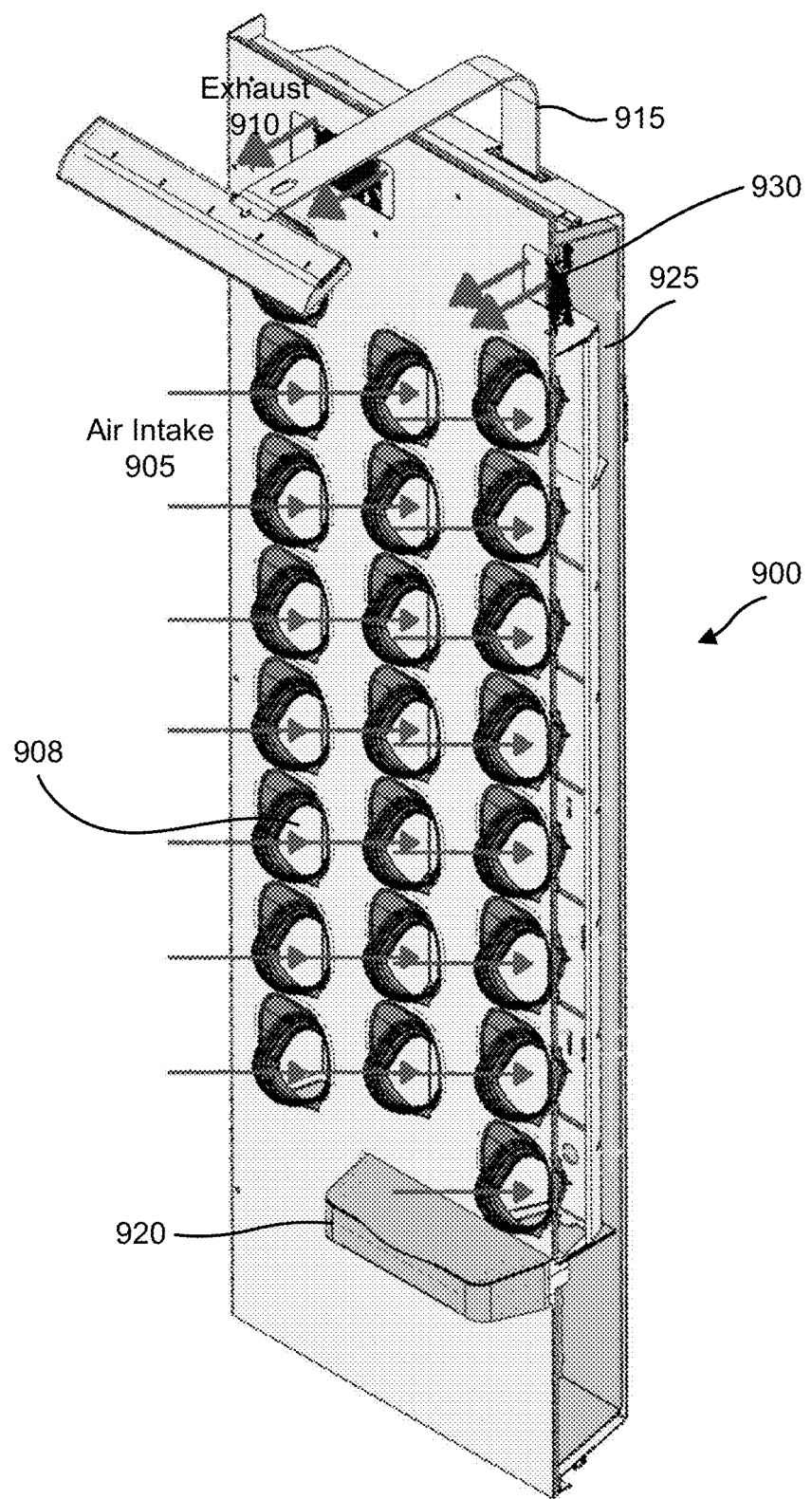
FIG. 9 illustrates a three-quarters view of a cutaway view of the second embodiment of the plant-based air purification system.

FIG. 8 illustrates another embodiment of the plant-based air purification system in the form of a tile 900, shown in cutaway view to show the flow of air. The air intake is depicted by arrows 905. Air is pulled in through the plant receptacle openings 908. The plant modules are omitted to better show the system. The air is pulled in through the receptacle openings 908, over the roots of the plant. The air then travels up the body of the tile 900 through a channel 925 and is exhausted out the top of the tile 900. The exhaust flow is depicted by arrow 910. The tile includes a lamp 915 and a reservoir 920. FIG. 9 illustrates the cutaway tile 900 in three-quarter view. The tiles may be installed next to each other to create large living walls. Ambient (room) air is pulled through the plant modules (not shown). A mid-frame acts as a false wall with holes near the bottom to evenly distribute the air across all plants. Clean air is pulled up through a channel 925 in the back of the tile and exhausted out of exhaust ports 930. Fans may be mounted in the exhaust ports to provide easy replacement of the fans.

Figure 10:
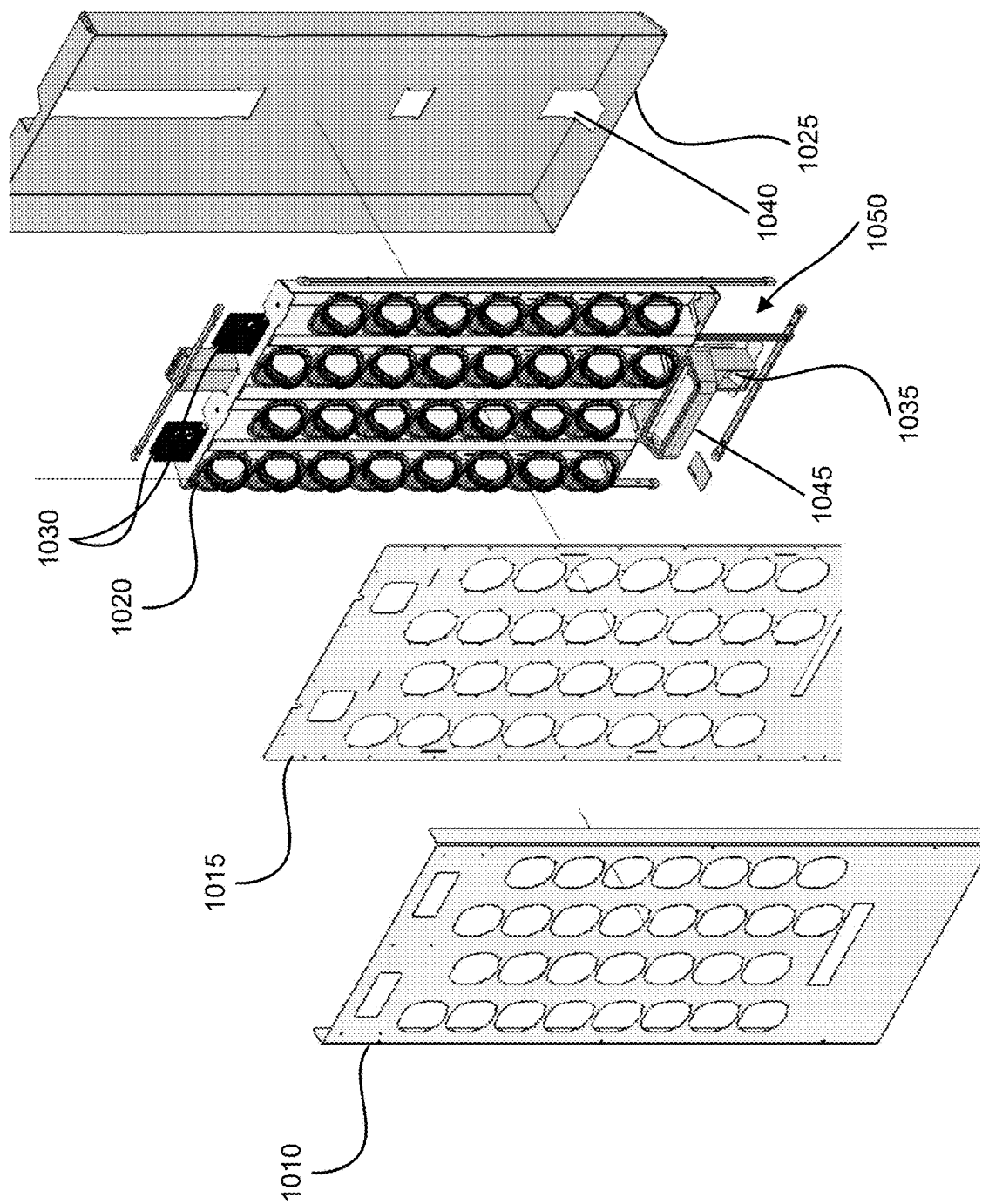
FIG. 10 illustrates an exploded view of the plant-based air purification system.

FIG. 10 illustrates an exploded view of the tile, showing cover 1010, a waterproof flexible membrane 1015 to prevent leakage around plant module openings, an internal frame 1020, and a back cover 1025. The internal frame 1020 provides support for mounting water delivery, water refill water ramps, fans 1030, a reservoir, a water pump 1035, and other infrastructure. The water pump is accessible via opening 1040 to facilitate replacement. A refilling port 1045 facilitates refilling a reservoir volume 1050 formed by the front and back cover, which are water tight. The front and back cover create a dead air space, which helps reduce thermal shock to the plants due to changes in ambient room temperature. In one embodiment, multiple tiles may be placed next to each other in close proximity to cover an entire wall.

Figure 11:
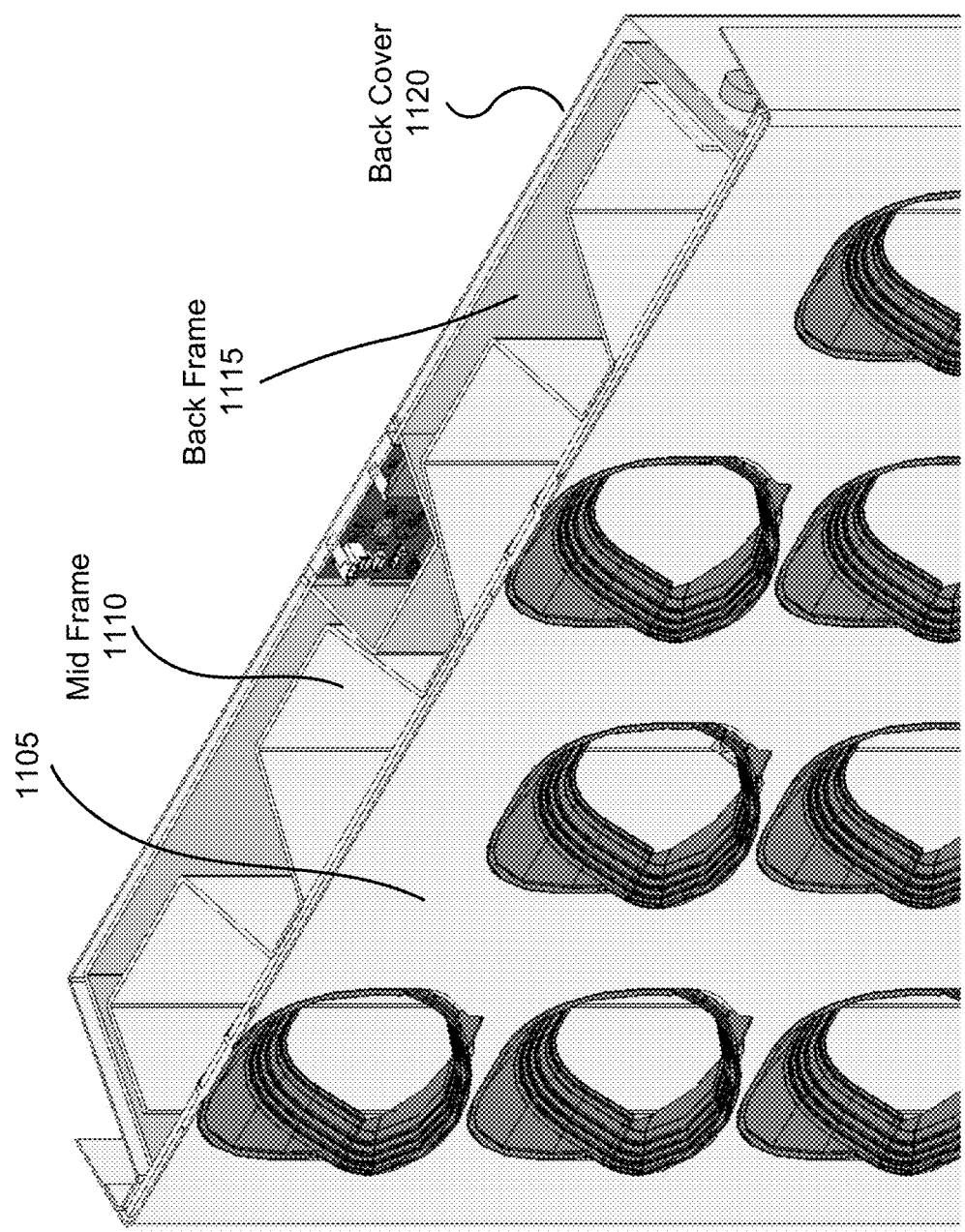
FIG. 11 illustrates a detail view of a cutaway of the plant-based air purification system.

FIG. 11 illustrates a detail of the tile, showing the components assembled. The front cover 1105 provides openings for the plant modules (not shown) to be inserted into. The internal frame comprises a mid frame 1110 and back frame 1115. The mid frame 1110 creates an internal wall which partially divides the interior formed by the front and back covers. It does not completely divide the interior, forming an incomplete (or false) wall. It is folded to channel water from plant to plant and to direct air flow. The mid frame 1110 provides mounting structure for water irrigation, water ramps for irrigation, and structural support for plant modules. The mid frame 1110 and the back frame 1115 create an air channel or flue from which air is evacuated from the system. The mid frame has perforated holes unevenly distributed along it. There are fewer holes near the top and more holes near the bottom in order to create an even flow of air through all plant module openings. There are fewer holes at the top because those holes are closer to the fans which are mounted close to the exhaust ports.

Figure 12:
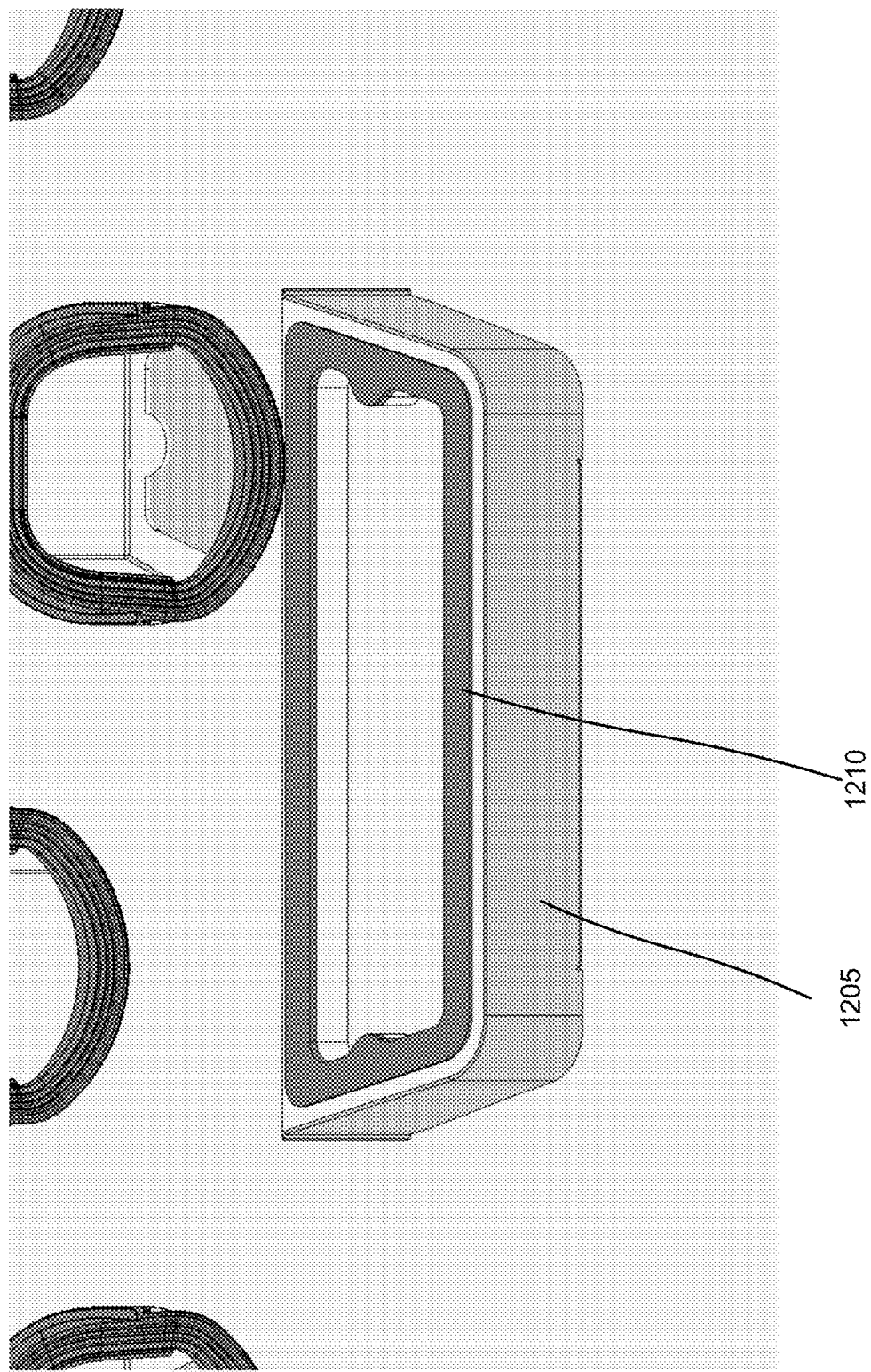
FIG. 12 illustrates a detail of a reservoir of the plant-based air purification system.

FIG. 12 shows the water refill port 1205. The water refill port 1205 is an external structure to allow the refilling of the tile even when the tiles are mounted side-to-side continuously. A water-tight gasket 1210 prevents leakage.

Figure 13:
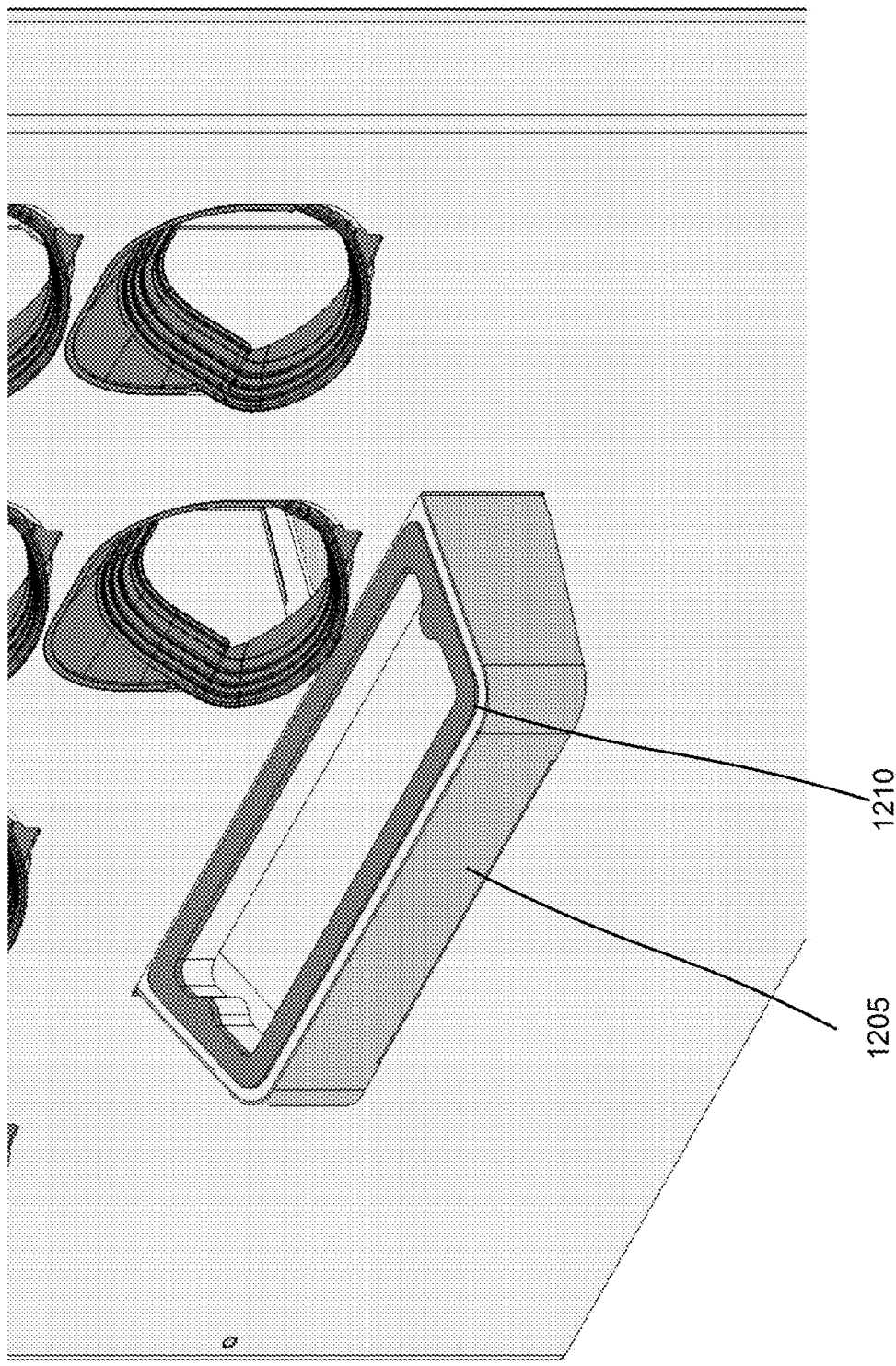
FIG. 13 illustrates a second angle of the reservoir.

FIG. 13 is a three-quarters view of the water refill port.

Figure 14:
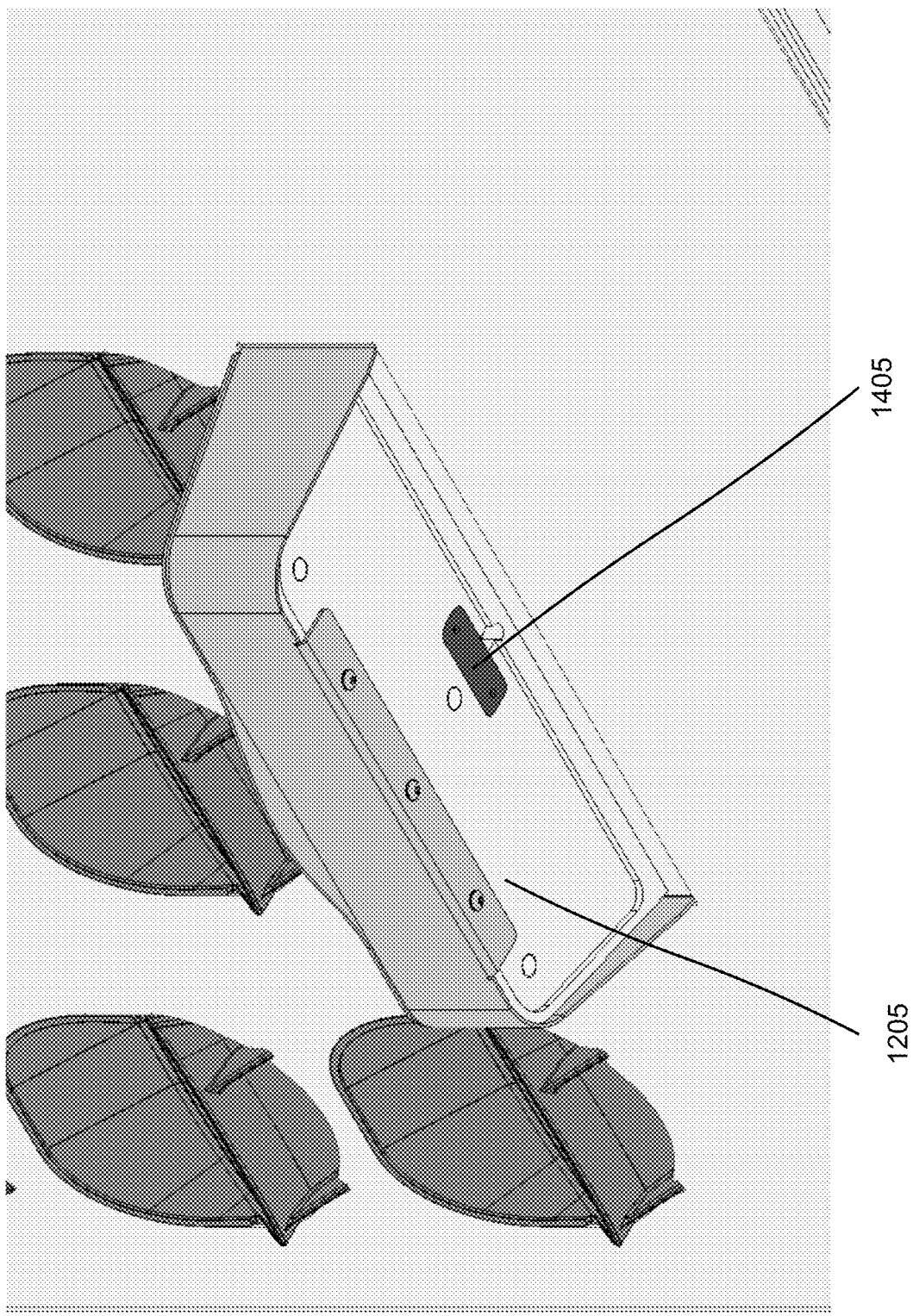
FIG. 14 is a detail of the underside of the reservoir.

FIG. 14 shows the underside of the water refill port 1205 on which is mounted an air sensor 1405. The air sensor may be magnetically attached to facilitate replacement, as current commercial air sensors are shorter lived than other components of the air purification system. Other locations for mounting the air sensor are contemplated, such as on the side of the unit, on the lighting fixture, or behind the unit. There may be an air sensor close to the exhaust ports or inside the exhaust header to monitor the air after the unit has purified it. Mounting the air sensor underneath the reservoir or in another location away from the exhaust header allows the sensor to sample the ambient room air quality, before purification. The sensor may measure particulates, volatile organic compounds, temperature, humidity, and noise.

Figure 15:
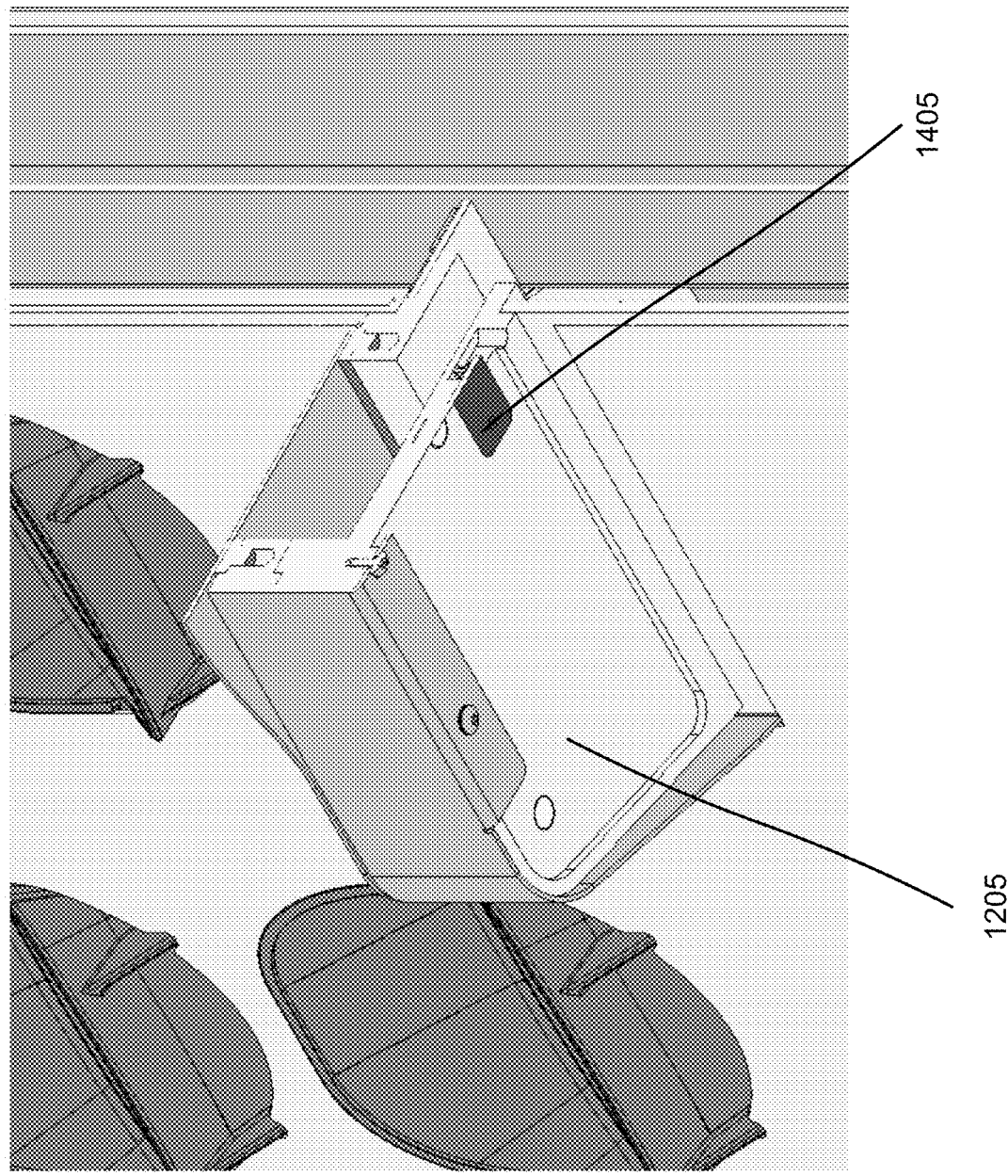
FIG. 15 is a cutaway view of the underside of the reservoir.

FIG. 15 shows the underside of the water refill port in cutaway.

Figure 16:
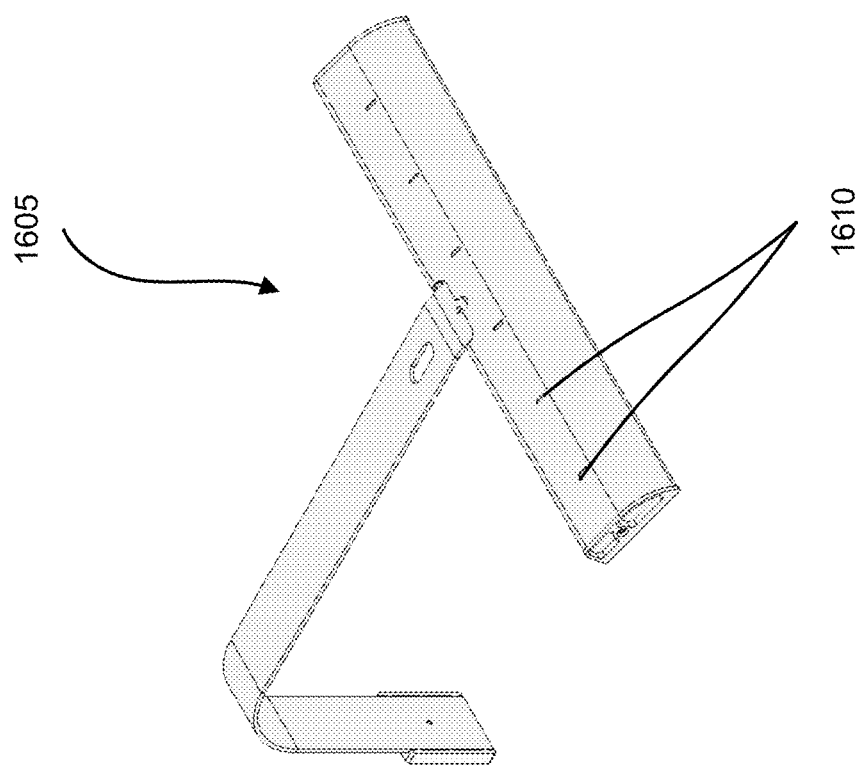
FIG. 16 illustrates a lamp attachment which attaches to and illuminates the plant-based air purification system.
Figure 17:
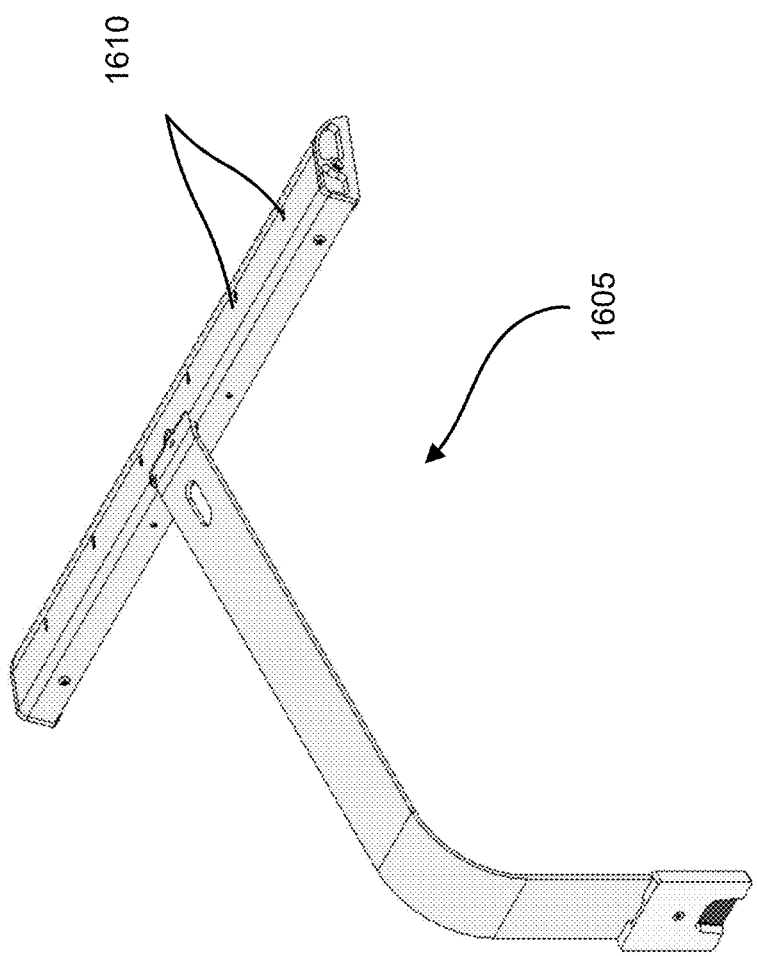
FIG. 17 illustrates the lamp attachment from a different angle.

FIGS. 16 and 17 show different views of a light bar 1605 for mounting on a tile. The light bar has embedded light sensors 1610 to detect local ambient lighting and adjust its own output to provide more light when it is in a dark location and less light when in a well-lit location. The light bar may be equipped with two spectrums of LEDs to aid the circadian rhythm of both the plants mounted in the body as well as humans or animals in the vicinity of the body. The LEDs may have a golden orange color or other color in the AM and a brighter light, possibly closer to white, at noon, returning to the golden orange or other color in the evening. The lights may also flash to indicate problems with the air purification system or to indicate diagnostic information, such as connection to or loss of connection to a Wi-Fi or wired network. Alternatively, other LEDs mounted on the body may be used to convey such information. The light bar may also have an audio sensor to detect ambient noise. The light, audio, and other sensor data may be sent wirelessly or by a wired connection to a central server to track how much ambient light the plant generally receives. Air quality (of intake, exhaust, or both) may be also sent. The audio data may provide a measure of how many people (or animals) are generally in the vicinity of the body. Historical data may be used to, for example, select a fan speed or how frequently to run the fan or water pumps. Ambient lighting data may also be used as a gauge of when the room is occupied.

Figure 18:
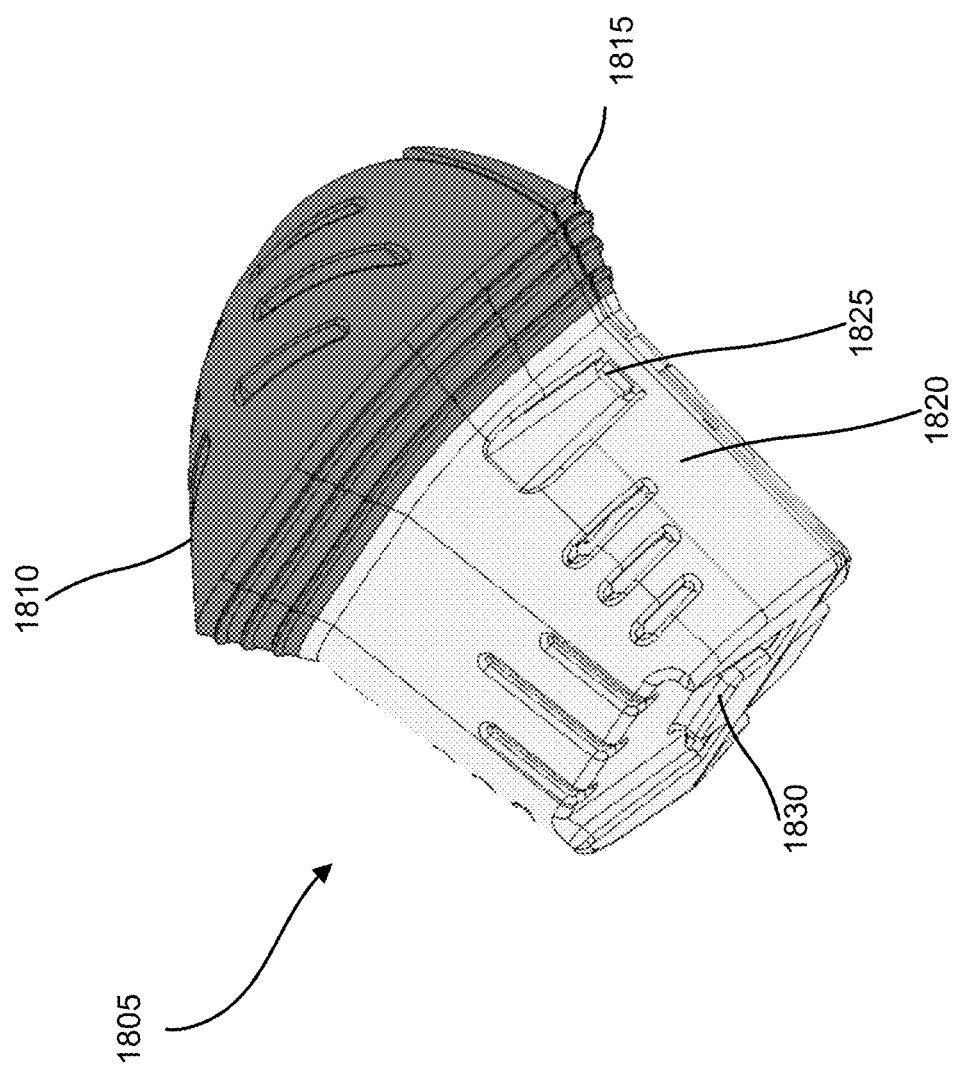
FIG. 18 illustrates a second embodiment of a module that attaches in a plant-based air purification system.
Figure 19A:
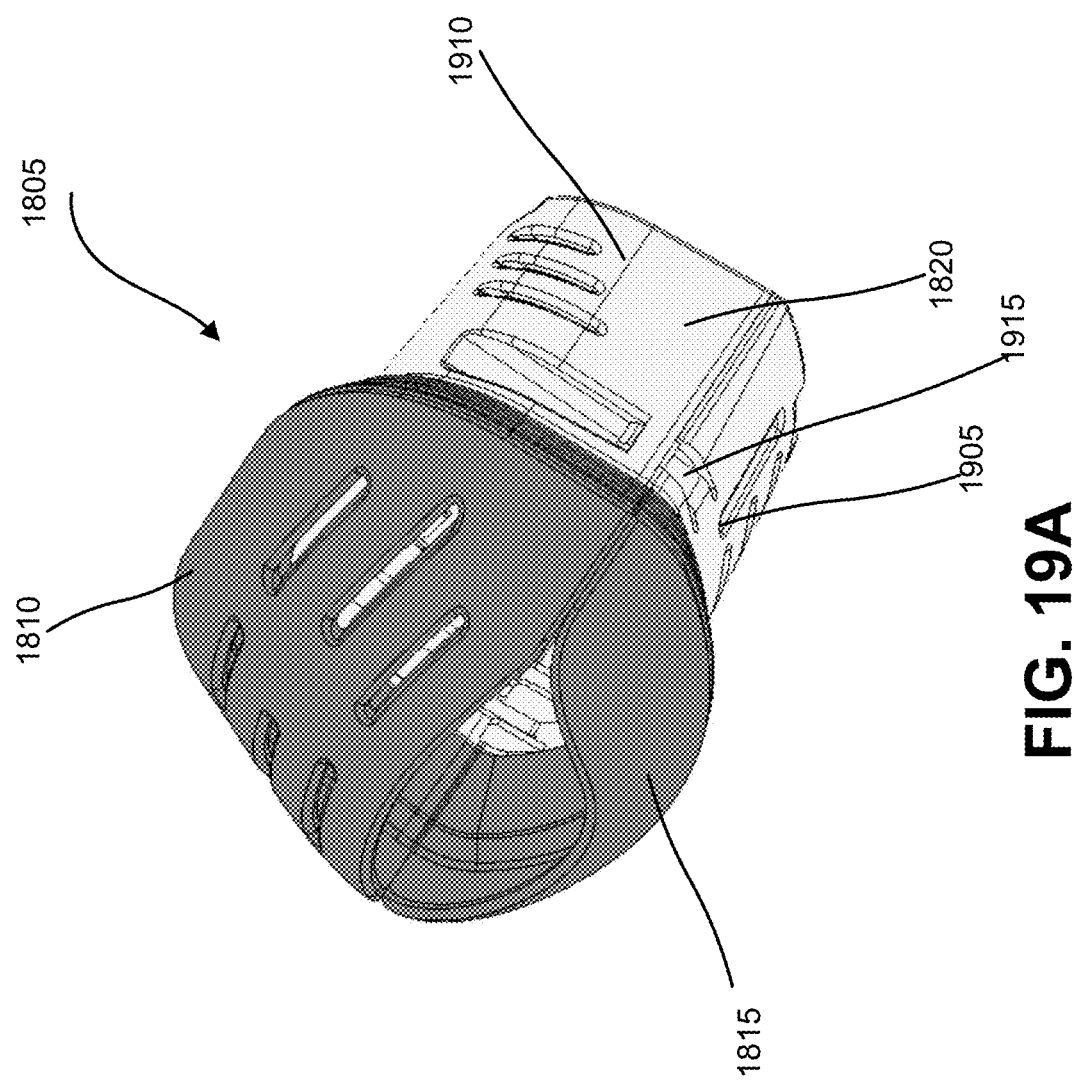
FIG. 19A illustrates a different view of the second embodiment of the module.
Figure 19B:
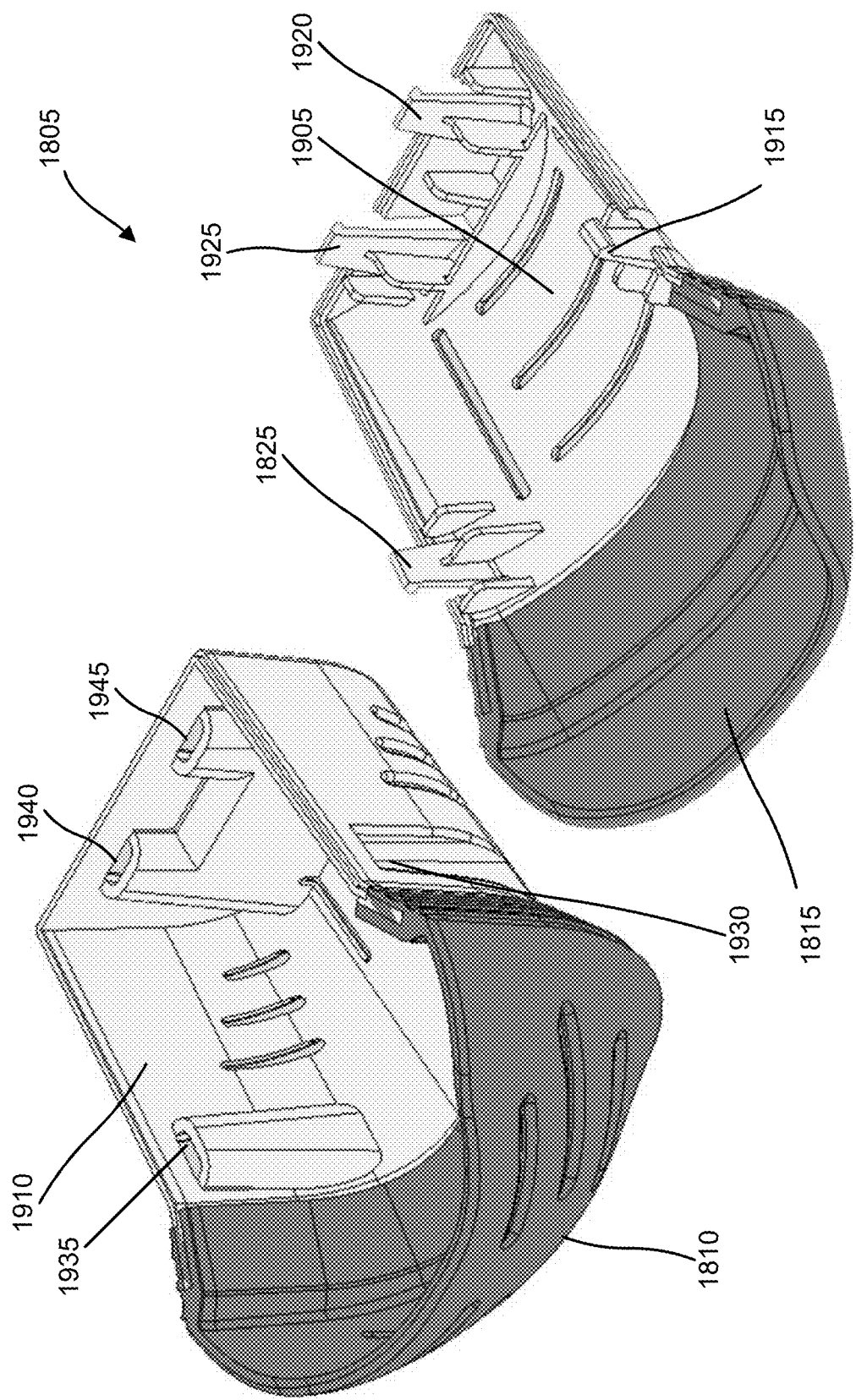
FIG. 19B illustrates the second embodiment of the module with the module unsnapped into two clamshell portions.

FIGS. 18, 19A, and 19B show a removable plant module 1805 for insertion into a receptacle of the tile. The plant module 1805 has a soft mouth formed of an upper section 1810 and a lower section 1815. The soft mouth sections protect the plant and expand as the plant grows. A lower rigid section 1820 is designed to fit into the receptacle of the tile. The rigid section provides firm support, while the upper and lower mouth sections form to the membrane section (1015 of FIG. 10) to form a watertight seal. FIG. 19 illustrates a lower portion 1905 and upper portion 1910 of the rigid lower section 1820. The upper portion 1910 and lower portion 1905 snap together to enclose the root ball of a plant. The upper portion 1910 and lower portion 1905 snap together at snap fastener 1915, with a snap fastener 1825 (visible in FIG. 18) on the other side of the rigid lower section 1820. There may also be two snap fasteners 1920, 1925 at the bottom 1830 of the rigid lower section. The snap fasteners 1825, 1915, 1920, and 1925 snap securely into slots 1930, 1935, 1940, and 1945, respectively. There may be more or fewer snap fasteners. Alternatively, guide posts may slide into slots to replace some of the snaps, for example on the bottom 1830 of the rigid lower section.

Figure 20:
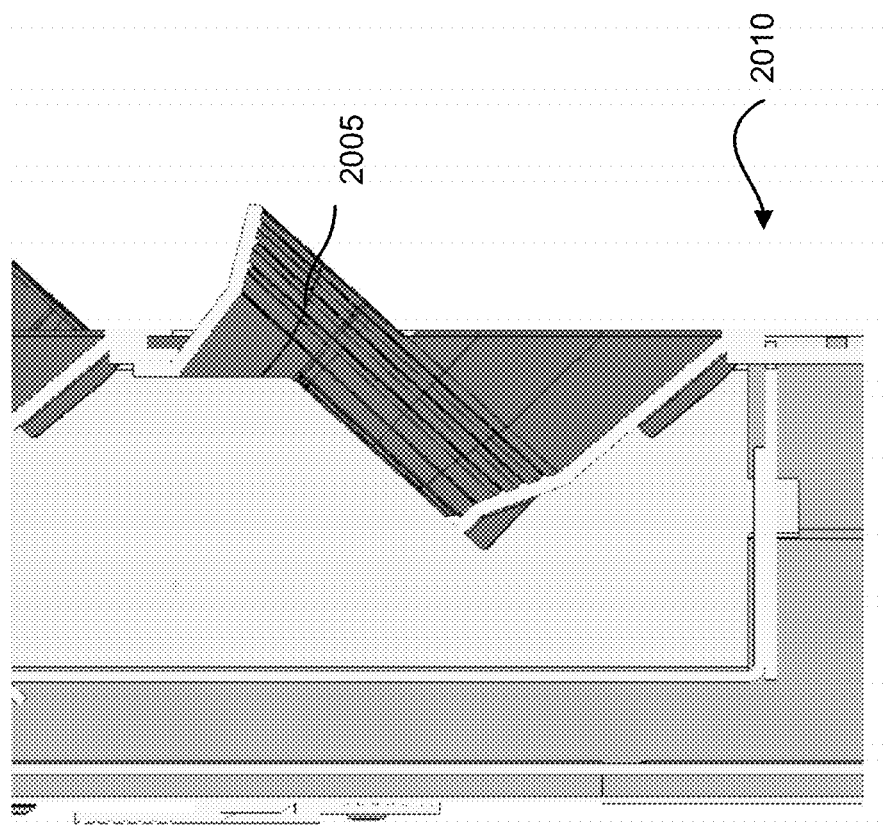
FIG. 20 illustrates a cutaway of a receptacle to receive a module in a plant-based air purification system.
Figure 21:
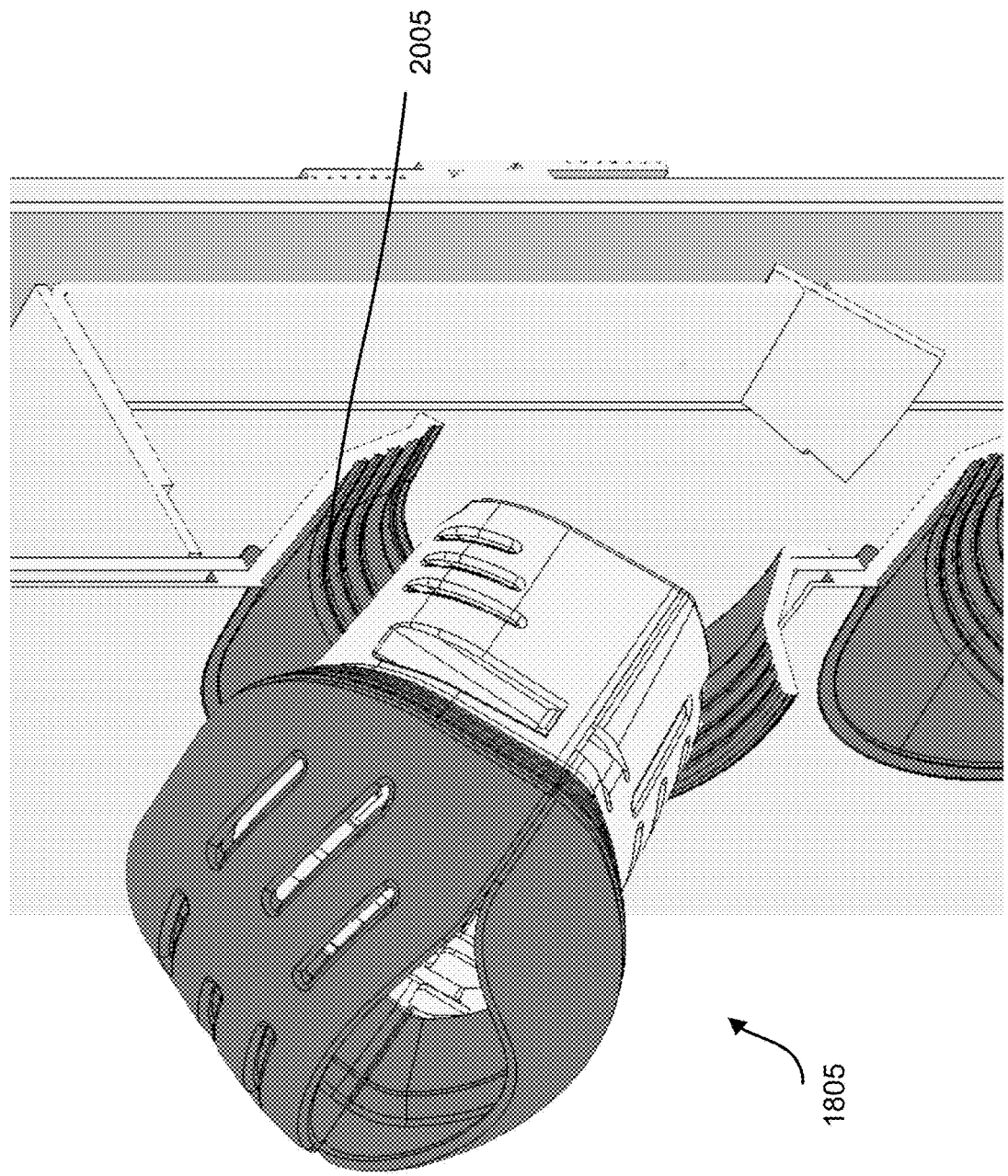
FIG. 21 illustrates a module being inserted into a receptacle of the plant-based air purification system.

FIG. 20 shows a receptacle 2005 of a tile 2010 to receive the lower rigid section 1820 of FIGS. 18 and 19. FIG. 21 shows plant module 1805 being inserted partially into receptacle 2005. The lower portions of the upper and lower mouth seal to the edges of the receptacle. A gasket or membrane 1015 (shown in FIG. 10), mounted to either the interior mid frame or front frame, creates a water-tight and air-tight seal around the plant module. This seal forces air through the openings in the upper and lower mouth portions of the plant module, so that air is channeled through the plant module where the air is exposed to microbes in the root and to activated charcoal, purifying the air, including removing volatile organic compounds.

Figure 22:
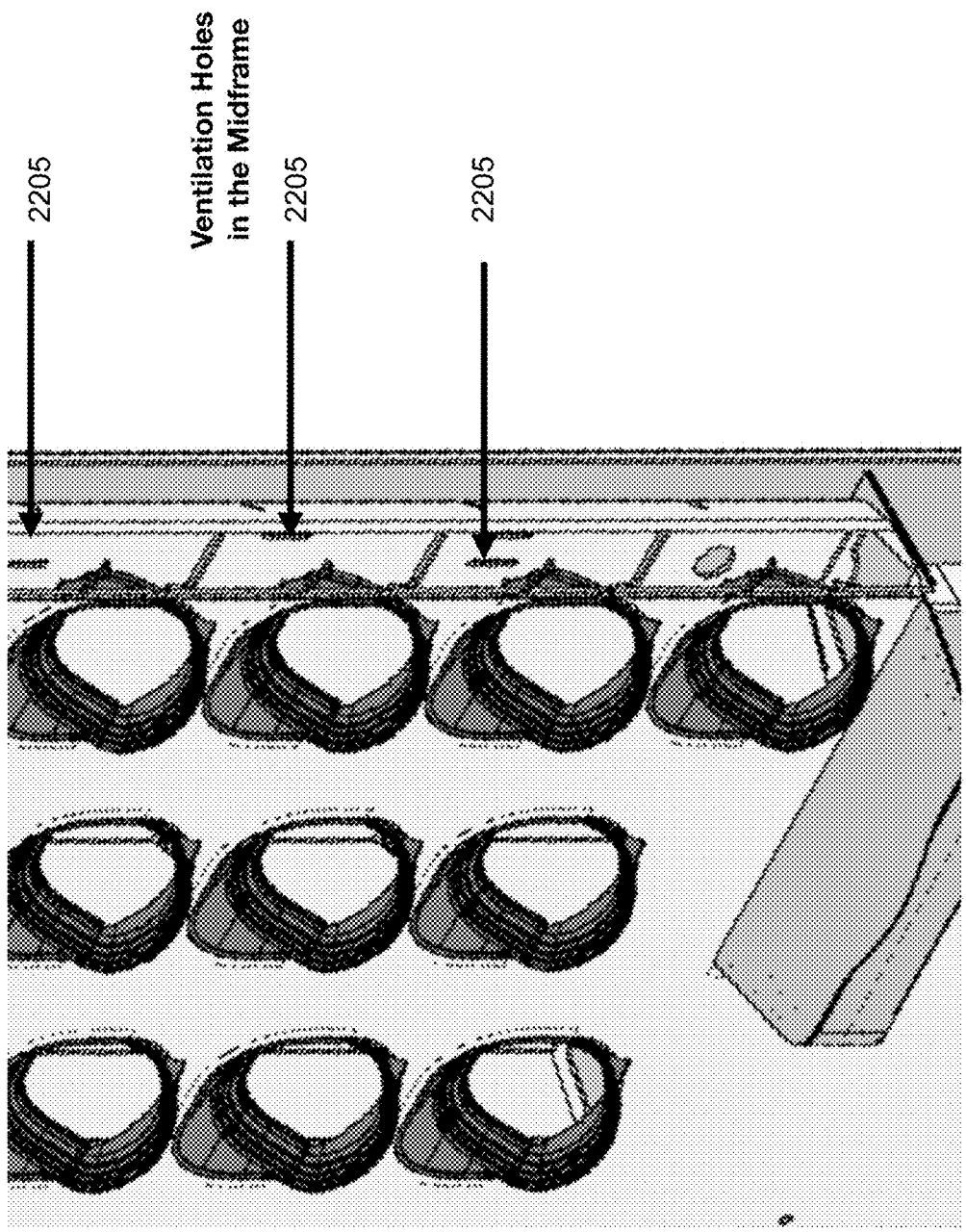
FIG. 22 illustrates ventilation holes in the mid frame of plant based air purification system.

FIG. 22 shows ventilation holes 2205 in the mid frame which route air to the back channel of the tile mount, which connects to the fan which exhausts the air out the exhaust ports.

Figure 23:
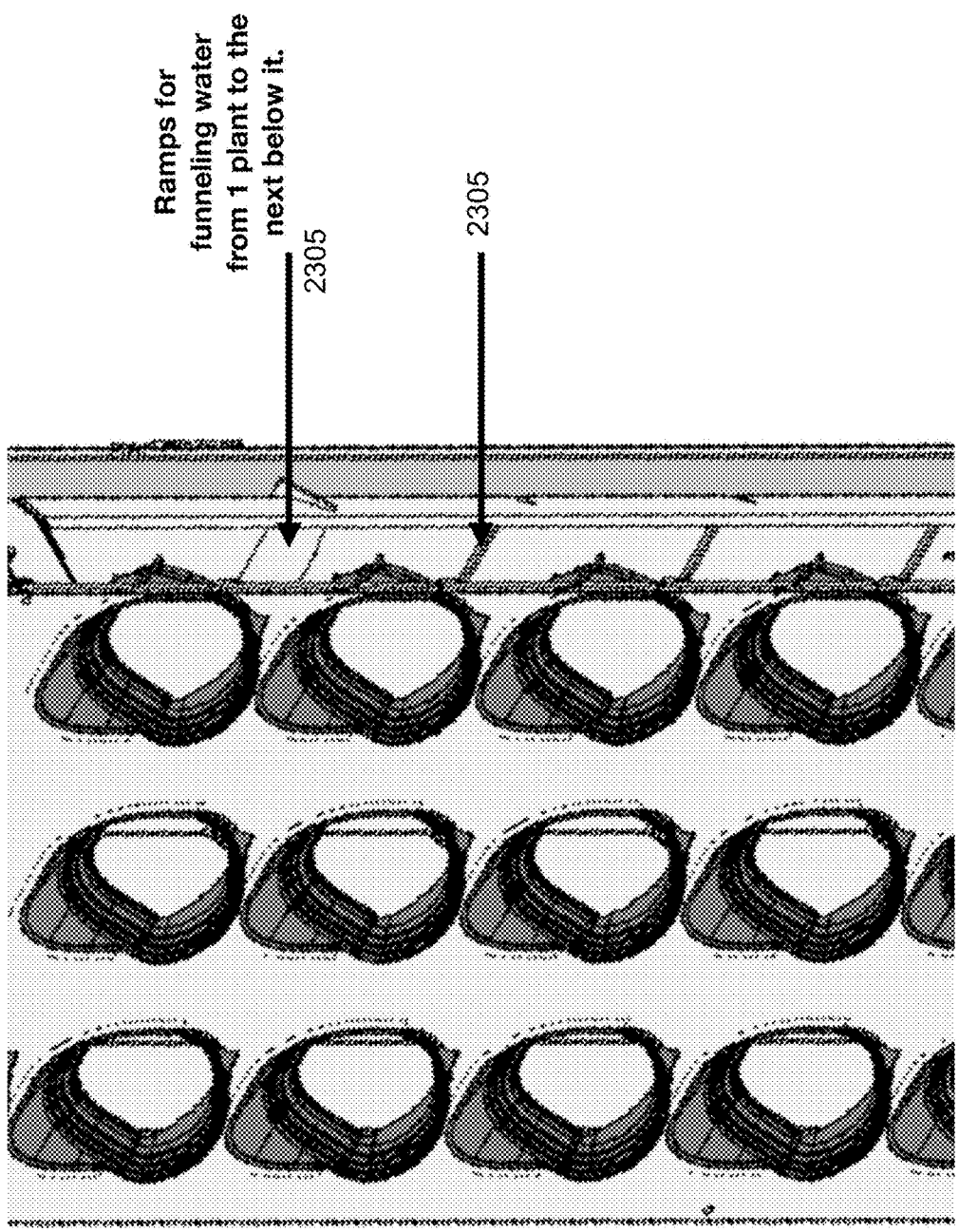
FIG. 23 illustrates channels in the plant-based air purification system for routing water to the different modules in the system.

FIG. 23 shows water ramps 2305 which channel water throughout the tile to provide water to the plant modules.
Sensors The system for indoor air purification may have interchangeable sensors and interchangeable plant modules for use with a plant module holder. The plant modules are interchangeable to allow the replacement of a plant without the replacement of the entire plant module holder. In one embodiment, sensors within the body of plant module holder may include a wired or wireless communication module to communicate parameters of the plant module to a data store and metrics system. Parameters may include water use, water remaining (water level), conductivity, humidity, salinity, pH, plant food use, plant food remaining, temperature, and local air quality. Other sensors may monitor carbon dioxide ($CO_2$) and humidity in the air around the system. Such sensors may be mounted in the lighting fixture to provide a better reading of air in the vicinity of the system rather than on the unibody, where the air would be more affected by the system. The system may have a volume sensor, which may serve to detect the presence of people. There may also be a light sensor to turn the LEDs in the lighting on and off, so that the lighting fixture mounted on the indoor air purification system is not on if there is sufficient ambient light. The light sensor may advantageously be mounted on the opposite side from the lighting fixture as the LEDs that provide light to the plants so as not to be influenced by the LEDs on the lighting fixture itself. The sensed parameters may be monitored by various sensors and sent by the wired or wireless communication module. These conditions may also cause LEDs mounted to the unibody or in the lighting fixture to change color.

To facilitate replacement of the air sensor or other sensor, a sensor may be mounted to the exterior of the unibody by a magnetic coupling with an embedded electronic connector. Air sensor electronics may be advantageously mounted outside the unibody as current air sensors have a useful lifespan of 1-2 years, less than other components of the indoor air purification system.

Parameters sensed by a humidity sensor may be used to determine how much water to pump to the plant modules. A sensor for how much water is in a tank may also alert the system to a low water condition, which may cause the pumps to conserve water, putting the system into a state that allows the plants to survive for as long as possible without additional water or nutrients. The sensors may cause LEDs to flash or an alert to be sent to a server where it may be relayed to a user interface, for example on a mobile phone. In one embodiment, in typical settings, the water pumps may run infrequently, for perhaps only minutes or fraction of a minute every hour or multiple hours (e.g., 45 seconds of water pumping every two hours). The humidity reading may be used to increase or decrease this, and the reservoir level may also increase or decrease the amount of water pumped.

Figure 24:
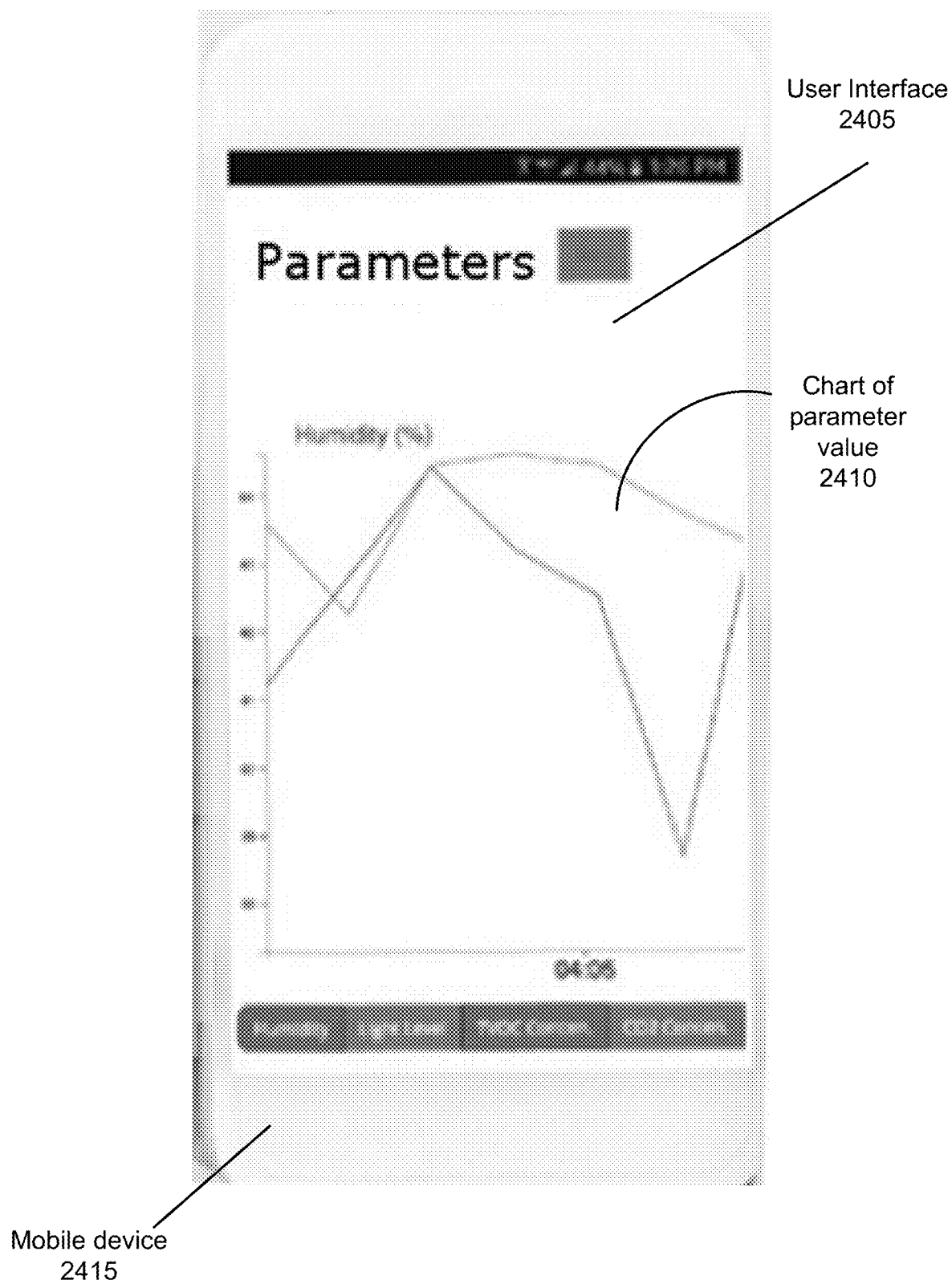
FIG. 24 illustrates a user interface for an application for monitoring air quality.

The sensors may communicate parameters to a server via wireless or wired communication. The server may then provide the parameters to an app, for example an app on a mobile device. FIG. 24 illustrates a possible user interface 2405, having a chart 2410 of parameter values, on a mobile device 2415. The server may provide the information to the mobile device, or the mobile device may connect to one or more air purification systems directly to monitor conditions in the air purification system. In some embodiments, air coming into the air purification system may be monitored as well as air in the exhaust header to provide information on the air purification's performance and plant health. The user interface may provide a display that indicates how the micro-climate in the room is by giving scores on, for example, humidity, temperature, and air quality. Water quality and amount of plant food and nutrients in the water and remaining in the unibody may be available via the user interface.

In another embodiment, the system for indoor air purification may comprise a housing comprising multipart HDPE or Red List compatible materials and a sensor board comprising a circuit board that is removable from the housing.

The system comprises a plurality of receptacles, each of which receives a respective plant module, at least one fan connected to and controlled by the sensor board, and at least one pump that pumps water to the receptacles. The pumps may cycle on and off, rather than remaining on. For example, the pumps may operate for a portion of a minute up to several minutes once every hour or longer. If high (or low) humidity is detected, the pumps may pump less (or more) frequently. If low water or nutrient conditions are sensed, the pumps may cycle less frequently to conserve water or nutrients.

In some embodiments, there is wireless communication that allows, for example, the use of a smartphone app to monitor and control aspects of the operation of the plant-based air purification system.

In response to signals from these sensors, or on a schedule, plant nutrition may be added to a tank mounted in the unibody. This nutrition may be added to the tank by removing a plant module, by a blanked opening for a plant module, and/or by a fill port. Plant nutrition may be delivered by a powder or solution to be added to plant water and may include de-chlorination chemicals, cell wall nutrition, root microbe food, probiotics, and other additives to improve the health of the microbes and plants.

Unibody Construction

A multipart HDPE (or other acceptable material) plastic in a formed and bonded state is formed into a body of a plant module holder such that the plastic components of the body are sealed and use no epoxy or adhesives to create a waterproof enclosure for the purposes of growing plants and is thereby 'Red List Free', easily recyclable, and leak-proof. The body is capable of holding plants, as well as externally mounted pumps, fans, and other electronics, allowing for easy replacement of those components without needing to open the unibody. The openings have gaskets that create an air-tight and water-tight seal when fixtures are inserted.

The body may further comprise a faceplate/facade that protects the unibody of the plant module holder and blocks light, reducing the growth of algae in the plant water.

As described above, the unibody may comprise an outer body that might be formed out of bonded plastic or other material and comprise a rear portion and a front face formed to provide a more or less airtight and watertight seal. In one embodiment, the front face may be attached to the rear portion by heating the front face and rear portion and compressing their edges or other portions of the components together (possibly while heating), thereby welding the two components into a body. This arrangement avoids leaks while also not using problematic materials, such as adhesives that may emit volatile organic compounds or other pollutants. The front face and rear portion may each have a rim or flange around the edge to facilitate welding the two components together. The front and rear may also be connected by fasteners to facilitate disassembly. For certain types of plants, microbes that live on the roots or the roots of the plant perform most of the air purification and toxin removal, thus channeling air to the roots aids in maximizing the efficiency of the air purification system. To facilitate an air tight seal, the plant modules may have gaskets which seal to the unibody. The unibody may also have an internal gasket to seal to the plant modules. In one embodiment, a sheet-shaped rubber gasket with cutouts to accept the plant modules may be attached to the front face (e.g., with a fastener or by heat welding) prior to the front face and rear portion being welded together.

The unibody may further comprise mounts on the unibody that create air pockets that insulate the unibody from temperature swings thereby protecting the plants.

The unibody may include a water tank mounted in the bottom of the unibody, a pump or multiple pumps, and a water routing irrigation system to deliver water and nutrition to the plant modules. The unibody may have a catch basin, either for each module or shared by the entire system, for capturing water and returning it to the tank. The return tubing from the catch basin to the tank may include a screen or filter to remove dirt and plant debris from the water to reduce the amount of buildup in the tank and to prevent clogging the pump. Instead of a tank, the unibody may be watertight and serve as a water reservoir.

Plant Module

A soft overmold forming a plant module that is Red List free provides an active seal while also providing a soft material for at least one plant to grow and expand into. The overmold has internal baffling that stabilizes the plants roots and the growth media to reduce plant injury during shipping, handling, and maintenance. In one embodiment, the overmold may be formed of TPE/TPU.

The plant module may be made from a material impregnated with chemical or physical pest management tool that repel insects, fungi, or other plant pest. The chemical or physical pest management tool may also be applied as a film to the module.

The plant module may also comprise a securing feature that allows the plant to be secured or locked into the plant module.

The plant module may also comprise baffling features that separate plant stalks thereby preventing rot, pests, and overcrowding of the plants.

A molded HDPE or Red List compatible plastic shell and backing may be formed into a plant shipping receptacle. The plastic shell and backing are bonded without epoxy or adhesives such that the receptacle is sealed to create a waterproof enclosure for the purposes of growing plants. The shipping receptacle may enclose the root ball of a plant or may enclose a plant module, which in turn encloses at least one root ball of at least one plant.

The plant shipping receptacle may further comprise features that exist within the plant shipping receptacle for the purpose of accepting a plant module.

The plant shipping receptacle may further comprise a molded feature that has a gasket that creates an airtight seal around a plant module, preventing water leakage into the packaging, conserving water for enhanced survivability during multi-day shipping.

The molded feature may further comprise a clipping mechanism that clips the plant module into the molded feature thus securing the plant.

The plant module for use with the plant shipping receptacle may comprise a gasket that creates an airtight seal when the plant module is inserted into the plant shipping receptacle.

Example Hardware

Figure 25:
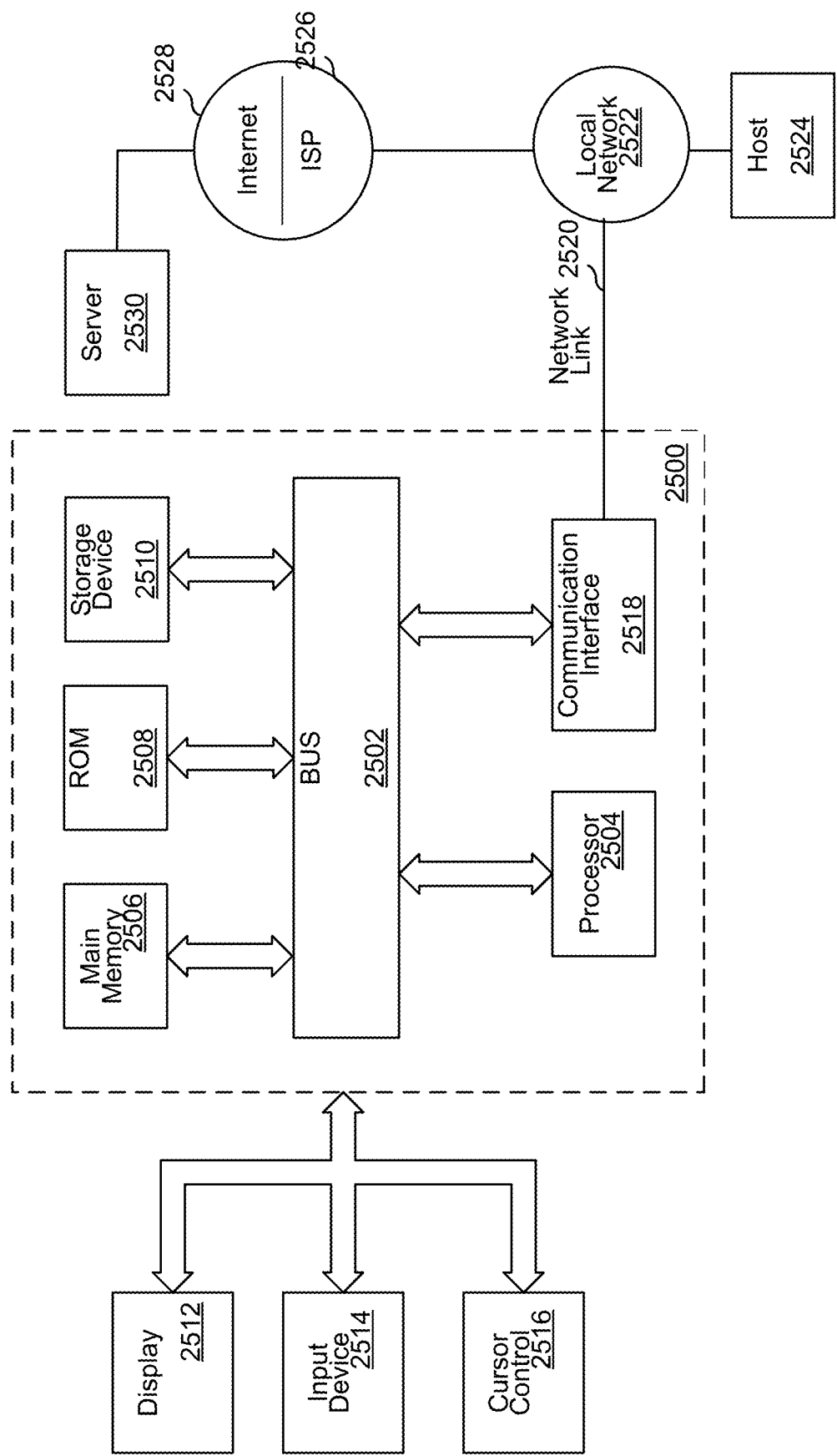
FIG. 25 illustrates an exemplary computer system.

According to one embodiment, the techniques of managing the purification system described herein are implemented by one or generalized computing systems programmed to perform the techniques pursuant to program instructions in firmware, memory, other storage, or a combination, as shown in FIG. 25. Special-purpose computing devices may be used, such as desktop computer systems, portable computer systems, handheld devices, networking devices or any other device that incorporates hard-wired and/or program logic to implement the techniques.

For example, FIG. 25 is a block diagram that illustrates a computer system 2500 upon which an embodiment of the invention may be implemented. Computer system 2500 includes a bus 2502 or other communication mechanism for communicating information, and a processor 2504 coupled with bus 2502 for processing information. Processor 2504 may be, for example, a general purpose microprocessor.

Computer system 2500 also includes a main memory 2506, such as a random access memory (RAM) or other dynamic storage device, coupled to bus 2502 for storing information and instructions to be executed by processor 2504. Main memory 2506 also may be used for storing temporary variables or other intermediate information during execution of instructions to be executed by processor 2504. Such instructions, when stored in non-transitory storage media accessible to processor 2504, render computer system 2500 into a special-purpose machine that is customized to perform the operations specified in the instructions.

Computer system 2500 further includes a read only memory (ROM) 2508 or other static storage device coupled to bus 2502 for storing static information and instructions for processor 2504. A storage device 2510, such as a magnetic disk or optical disk, is provided and coupled to bus 2502 for storing information and instructions.

Computer system 2500 may be coupled via bus 2502 to a display 2512, such as a computer monitor, for displaying information to a computer user. An input device 2514, including alphanumeric and other keys, is coupled to bus 2502 for communicating information and command selections to processor 2504. Another type of user input device is cursor control 2516, such as a mouse, a trackball, or cursor direction keys for communicating direction information and command selections to processor 2504 and for controlling cursor movement on display 2512. This input device typically has two degrees of freedom in two axes, a first axis (e.g., x) and a second axis (e.g., y), that allows the device to specify positions in a plane.

Computer system 2500 may implement the techniques described herein using customized hard-wired logic, one or more ASICs or FPGAs, firmware and/or program logic which in combination with the computer system causes or programs computer system 2500 to be a special-purpose machine. According to one embodiment, the techniques herein are performed by computer system 2500 in response to processor 2504 executing one or more sequences of one or more instructions contained in main memory 2506. Such instructions may be read into main memory 2506 from another storage medium, such as storage device 2510. Execution of the sequences of instructions contained in main memory 2506 causes processor 2504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2510. Volatile media includes dynamic memory, such as main memory 2506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2502. Transmission media can also take the form of acoustic or light waves, such as those generated during radio-wave and infra-red data communications.

Various forms of media may be involved in carrying one or more sequences of one or more instructions to processor 2504 for execution. For example, the instructions may initially be carried on a magnetic disk or solid state drive of a remote computer. The remote computer can load the instructions into its dynamic memory and send the instructions over a network connection. A modem or network interface local to computer system 2500 can receive the data. Bus 2502 carries the data to main memory 2506, from which processor 2504 retrieves and executes the instructions. The instructions received by main memory 2506 may optionally be stored on storage device 2510 either before or after execution by processor 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card, cable modem, satellite modem, or a modem to provide a data communication connection to a corresponding type of telephone line. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams. The signals through the various networks and the signals on network link 2520 and through communication interface 2518, which carry the digital data to and from computer system 2500, are example forms of transmission media.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518. The received code may be executed by processor 2504 as it is received, and/or stored in storage device 2510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A plant module, adapted to hold a root ball of a live plant, comprising:
    a rigid portion configured to at least partially enclose the root ball; and
    a sealing rim configured to support the plant module in a vertical plant holder while also forming a seal allowing for differences in air pressure between a first side of the sealing rim and an opposite side of the sealing rim, the plant module comprising at least one of:
        one or more interior baffles formed as part of the rigid portion for constraining movement of the root ball when inserted into the plant module; or
        one or more exterior features formed as part of the rigid portion for constraining movement of the plant module relative to a shipping container when the one or more exterior features are in contact with the shipping container and/or in contact with packing materials inside the shipping container.

2. The plant module of claim 1 wherein the rigid portion includes a first shell portion and a second shell portion that are connected by a hinge flexibly connecting the first shell portion and the second shell portion such that they are movable between an open position and a closed position, wherein the root ball is insertable into the plant module in the open position.

3. The plant module of claim 1 wherein the rigid portion includes a first shell portion and a second shell portion, the shell portion includes at least one snap fastener, the first shell portion and the second shell portion snapping together via the snap fastener to enclose the root ball of a plant.

4. The plant module of claim 1 further comprising a first pliant covering, attached to the rigid portion, the first pliant covering forming a portion of the sealing rim.

5. The plant module of claim 4 further comprising a second pliant covering, attached to the rigid portion, overlapping the first pliant covering, the first pliant covering and the second pliant covering forming the sealing rim.

6. The plant module of claim 1, wherein the shipping container is sealed to create a waterproof enclosure for live plants.

7. The plant module of claim 6, wherein the shipping container further comprises features that exist within the shipping container adapted for accepting a plant module.

8. The plant module of claim 7, wherein the shipping container further comprises a molded feature that has a gasket that creates an airtight seal around a plant module.

9. The plant module of claim 1, wherein the plant module is Red list free, rigid portion being molded HDPE.

10. The plant module of claim 1, wherein a chemical or physical pest management tool that repel insects, fungi, or other plant pest is impregnated in material of the plant module or applied as a film to the plant module.

11. The plant module of claim 1, further comprising:
    a soft overmold which provides an active seal while also providing a soft material for at least one plant to grow and expand into; and
    internal baffling of the rigid portion that stabilizes roots of the at least one plant contained within the plant module and holds growth media.

12. A vertical plant module holder, adapted to hold a plurality of plant modules, comprising:
    a front face, having thereon an array of openings for receiving plant modules;
    a plurality of watertight lips, wherein a watertight lip is provided for each opening of the array of openings, positioned to direct falling liquids from an exterior of the vertical plant module holder to an interior region of the vertical plant module holder;
    a rear face, wherein the front face and the rear face together at least partially enclose the interior region, wherein the rear face and the front face are connectable to form an airtight seal and a watertight seal.

13. The vertical plant module holder of claim 12, wherein the rear face and the front face are connectable by being attached without requiring use of epoxy.

14. The vertical plant module holder of claim 12, wherein the front face and the rear face are formed of multipart HDPE or Red List compatible plastic, and bonded into a unibody such that plastic components of the unibody are sealed and use no epoxy or adhesives to create a waterproof enclosure for growing plants and is thereby 'Red List Free', easily recyclable, and leakproof.

15. The vertical plant module holder of claim 12, wherein the front face and rear face create air pockets that insulate the interior region from temperature swings thereby protecting a plant contained in a plant module received by an opening of the array of openings.

16. A system for indoor air purification comprising:
a housing;
a sensor board comprising a circuit board that is removable from the housing;
a plurality of receptacles, each of which receives a respective plant module;
at least one fan connected to and controlled by the sensor board; and
at least one pump that pumps water to the receptacles.

17. The system for indoor air purification of claim 16, further comprising a plant module, adapted to hold a root ball of a live plant, receivable by a receptacle of the plurality of receptacles, the plant module comprising:
a first shell portion;
a second shell portion, wherein the first shell portion and the second shell portion are connectable to enclose the root ball; and
a sealing rim configured to support the plant module in the receptacle while also forming a seal allowing for differences in air pressure between a first side of the sealing rim and an opposite side of the sealing rim.

18. The system for indoor air purification of claim 16, wherein the housing comprises a front cover and a back cover, the front cover and back cover enclosing a waterproof flexible membrane and an internal frame, the internal frame providing support for the at least one fan and the at least one water pump, the flexible membrane having a plurality of openings, one for each receptacle.

19. The system for indoor air purification of claim 18, wherein the flexible membrane is adapted to form a seal with a sealing rim of a plant module.

* * * * *